US012674064B2

(12) United States Patent
Itoi et al.

(10) Patent No.: US 12,674,064 B2
(45) Date of Patent: Jul. 7, 2026

(54) DISPERSANT COMPOSITION FOR ELECTRICITY STORAGE DEVICE ELECTRODES

(71) Applicant: KAO CORPORATION, Tokyo (JP)

(72) Inventors: Akito Itoi, Wakayama (JP); Kyoichi Shirota, Wakayama (JP); Kazuo Oki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/708,050

(22) PCT Filed: Nov. 4, 2022

(86) PCT No.: PCT/JP2022/041220
§ 371 (c)(1),
(2) Date: May 7, 2024

(87) PCT Pub. No.: WO2023/080207
PCT Pub. Date: May 11, 2023

(65) Prior Publication Data

US 2025/0257228 A1 Aug. 14, 2025

(30) Foreign Application Priority Data

Nov. 8, 2021 (JP) ................................ 2021-182056

(51) Int. Cl.

| | |
|---|---|
| ***C09D 7/45*** | (2018.01) |
| ***C08F 220/18*** | (2006.01) |
| ***C08F 220/28*** | (2006.01) |
| ***C08F 220/44*** | (2006.01) |
| ***C08K 3/04*** | (2006.01) |
| ***C08K 5/17*** | (2006.01) |
| ***C08K 5/18*** | (2006.01) |
| ***C08K 5/357*** | (2006.01) |
| ***C09D 5/24*** | (2006.01) |
| ***C09D 7/61*** | (2018.01) |
| ***C09D 7/63*** | (2018.01) |
| ***C09D 7/65*** | (2018.01) |
| ***H01M 4/04*** | (2006.01) |
| ***H01M 4/62*** | (2006.01) |

(52) U.S. Cl.
CPC .......... *C09D 7/45* (2018.01); *C08F 220/1818* (2020.02); *C08F 220/281* (2020.02); *C08F 220/44* (2013.01); *C09D 5/24* (2013.01); *C09D 7/61* (2018.01); *C09D 7/63* (2018.01); *C09D 7/65* (2018.01); *H01M 4/0404* (2013.01); *H01M 4/625* (2013.01); *C08F 2800/20* (2013.01); *C08K 3/041* (2017.05); *C08K 5/17* (2013.01); *C08K 5/18* (2013.01); *C08K 5/357* (2013.01); *C08K 2201/001* (2013.01); *C08K 2201/011* (2013.01)

(58) Field of Classification Search
CPC ..... C09D 5/26; C09D 133/066; H01M 4/625; C08F 2800/20; C08F 220/1818; C08F 226/06; C08K 2201/001; C08K 2201/011; C08L 33/06; C08L 33/14
USPC .................................................. 252/510, 511
See application file for complete search history.

(56) References Cited

U.S. PATENT DOCUMENTS

| | | | |
|---|---|---|---|
| 2019/0372121 | A1 | 12/2019 | Chen et al. |
| 2020/0411868 | A1 | 12/2020 | Murase et al. |
| 2023/0383135 | A1 | 11/2023 | Itoi et al. |

FOREIGN PATENT DOCUMENTS

| | | | |
|---|---|---|---|
| EP | 3786110 | A1 | 3/2021 |
| EP | 4 228 035 | A1 | 8/2023 |
| JP | 2010033957 | A * | 2/2010 |
| JP | 4689261 | B2 | 5/2011 |
| JP | 2013229263 | A * | 11/2013 |
| JP | 2014-181140 | A | 9/2014 |
| JP | 2017-228413 | A | 12/2017 |
| JP | 6531926 | B1 | 6/2019 |
| JP | 2019-192537 | A | 10/2019 |
| JP | 2020-189770 | A | 11/2020 |
| JP | 2022-63854 | A | 4/2022 |

(Continued)

OTHER PUBLICATIONS

Translation of JP-2013229263-A (Year: 2013).*

(Continued)

*Primary Examiner* — Tri V Nguyen
(74) *Attorney, Agent, or Firm* — Birch, Stewart, Kolasch & Birch, LLP

(57) ABSTRACT

An aspect of the present disclosure relates to a dispersant composition for an electrode of a power storage device. The dispersant composition contains an acrylic polymer (A), an amine compound (B) with a boiling point of 200° C. or less, and an organic solvent (C). The acrylic polymer (A) contains a constitutional unit a represented by the following formula (1). The compound (B) is at least one amine compound selected from the group consisting of a secondary aliphatic amine, a tertiary aliphatic amine, an aromatic amine, and a heterocyclic amine.

[Chemical Formula 1]

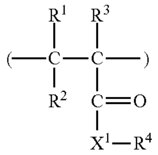

(1)

17 Claims, No Drawings

(56) References Cited

FOREIGN PATENT DOCUMENTS

| | | | | | |
|---|---|---|---|---|---|
| WO | WO 2013/151062 A1 | | 10/2013 | | |
| WO | WO-2017104554 A1 | * | 6/2017 | .......... | H01M 50/409 |

OTHER PUBLICATIONS

Translation of WO-2017104554-A1 (Year: 2017).*
Translation of JP-2010033957-A (Year: 2010).*
International Search Report, issued in PCT/JP2022/041220, PCT/ISA/210, dated Jan. 10, 2023.
Notice of Reasons for Refusal for Japanese Application No. 2021-182056, dated Mar. 2, 2023.
Notice of Reasons for Refusal for Japanese Application No. 2021-182056, dated May 25, 2023.
Extended European Search Report for European Application No. 22890027.0, dated Nov. 21, 2025.

* cited by examiner

DISPERSANT COMPOSITION FOR ELECTRICITY STORAGE DEVICE ELECTRODES

TECHNICAL FIELD

The present invention relates to a dispersant composition for an electrode of a power storage device.

BACKGROUND ART

In recent years, efforts to curb global warming have spurred the development of electric vehicles. Electric vehicles do not emit carbon dioxide, but have short mileage and long battery charging time, compared to gasoline-powered vehicles. To reduce the charging time, the rate of electron transfer in a positive electrode should be increased. At present, a carbon material is used as a conductive assistant (conductive material) for a positive electrode of a non-aqueous electrolyte power storage device. However, the use of the carbon material increases the viscosity of a conductive material slurry or positive electrode paste, which may lead to poor handleability. Therefore, a reduction in the viscosity of the slurry or paste is desirable.

JP 2014-181140 A (Patent Document 1) discloses a fine carbon fiber dispersion that contains fine carbon fibers, a dispersion medium (amide-based organic solvent), a polymer-based dispersant, and an organic basic compound with a pKa of 7.5 or more in water. Examples of the organic basic compound with a pKa of 7.5 or more include nitrogen-containing organic compounds having primary to tertiary amino groups. The polymer-based dispersant may be, e.g., methylcellulose, polyvinylpyrrolidone, or polyvinyl alcohol.

Japanese Patent No. 6531926 (Patent Document 2) discloses a carbon nanotube dispersion for an electrode. The carbon nanotube dispersion contains carbon nanotubes, polyvinylpyrrolidone, N-methyl-2-pyrrolidone, and an amine-based compound.

US 2019/0372121 A1 (Patent Document 3) discloses a composition containing the following: carbonaceous particles such as carbon black; a cellulosic dispersant; a polymer including a maleic anhydride moiety such as poly(methyl vinyl ether maleic anhydride), poly(isobutylene maleic anhydride), poly(ethylene maleic anhydride), or poly(styrene-co-maleic anhydride); an amine compound having a boiling point of 200° C. or less and serving as a co-dispersant; and a dispersion medium.

WO 2013/151062 A1 (Patent Document 4) discloses an acrylic polymer that contains a constitutional unit having a hydrocarbon group with 8 to 30 carbon atoms, as a copolymer included in a positive electrode paste for a power storage device.

DISCLOSURE OF THE INVENTION

An aspect of the present disclosure relates to a dispersant composition for an electrode of a power storage device. The dispersant composition contains an acrylic polymer (A), an amine compound (B) with a boiling point of 200° C. or less, and an organic solvent (C). The acrylic polymer (A) contains a constitutional unit a represented by the following formula (1). The compound (B) is at least one amine compound selected from the group consisting of a secondary aliphatic amine, a tertiary aliphatic amine, an aromatic amine, and a heterocyclic amine.

[Chemical Formula 1]

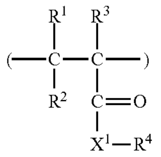

(1)

where $R^1$, $R^2$, and $R^3$ are the same as or different from each other and represent a hydrogen atom, a methyl group, or an ethyl group, $X^1$ represents a nitrogen atom or an oxygen atom, and $R^4$ represents a hydrocarbon group having 8 to 30 carbon atoms.

An aspect of the present disclosure relates to a carbon material-based conductive material slurry that contains carbon material-based conductive materials (D) and the dispersant composition of the present disclosure.

An aspect of the present disclosure relates to a positive electrode paste for a power storage device. The positive electrode paste contains the dispersant composition of the present disclosure.

An aspect of the present disclosure relates to a method for producing a positive electrode coating. The method includes applying the positive electrode paste of the present disclosure to a current collector, and then drying the positive electrode paste.

An aspect of the present disclosure relates to a method for producing a positive electrode for a power storage device. The positive electrode includes a current collector and a positive electrode coating disposed on the current collector. The method includes applying the positive electrode paste of the present disclosure to a current collector, and then drying the positive electrode paste.

Effects of the Invention

In one aspect, the present disclosure can provide a dispersant composition for an electrode of a power storage device. The dispersant composition enables the preparation of a carbon material-based conductive material slurry and a positive electrode paste, both of which has a low viscosity and good handleability, and also enables the reduction in a resistance value of a positive electrode coating and the reduction in a direct current resistance value of a power storage device.

In one aspect, the present disclosure can provide a carbon material-based conductive material slurry and a positive electrode paste, both of which has a low viscosity and good handleability.

In one aspect, the present disclosure can provide a positive electrode coating with a low resistance value and a positive electrode for a power storage device that includes the positive electrode coating.

DESCRIPTION OF THE INVENTION

Using the technologies of Patent Documents 1 and 2 can increase the resistance value of a positive electrode coating and the direct-current resistance value of a power storage device. To form a positive electrode coating having a better conductive path and lower resistance, dispersants and additives are required that are capable of reducing the viscosities of a conductive material slurry and a positive electrode paste that contain carbon material-based conductive materials such as carbon nanotubes.

With the foregoing in mind, in one aspect, the present disclosure provides a dispersant composition for an electrode of a power storage device that enables the preparation of a carbon material-based conductive material slurry and a positive electrode paste, both of which has a low viscosity and good handleability, and that also enables the reduction in the resistance value of a positive electrode coating and the reduction in the direct current resistance value of a power storage device.

[Dispersant Composition for Electrode of Power Storage Device]

The present disclosure is based on the findings that the use of a specific acrylic polymer (A) in combination with a specific amine compound (B) (also referred to as a "compound (B)" in the following) can provide a dispersant composition for an electrode of a power storage device (also referred to as a "dispersant composition of the present disclosure" in the following) that enables the preparation of a carbon material-based conductive material slurry and a positive electrode paste, both of which has a low viscosity and good handleability.

In one aspect, the present disclosure relates to a dispersant composition that contains an acrylic polymer (A), a compound (B), and an organic solvent (C). The acrylic polymer (A) contains a constitutional unit a represented by the formula (1). The compound (B) is at least one amine compound selected from the group consisting of a secondary aliphatic amine, a tertiary aliphatic amine, an aromatic amine, and a heterocyclic amine, and has a boiling point of 200° C. or less.

In one aspect, the present disclosure can provide a dispersant composition for an electrode of a power storage device that enables the preparation of a carbon material-based conductive material slurry and a positive electrode paste for a power storage device, both of which has a low viscosity and good handleability. The dispersant composition of the present disclosure can be used to provide a low-viscosity, easy to handle carbon material-based conductive material slurry of the present disclosure (also referred to as a "conductive material slurry of the present disclosure" in the following) and a low-viscosity, easy-to-handle positive electrode paste for a power storage device of the present disclosure (also referred to as a "positive electrode paste of the present disclosure" in the following). Moreover, the positive electrode paste of the present disclosure, which is prepared by using the dispersant composition of the present disclosure, can be used to produce a positive electrode coating with a low resistance value, a positive electrode for a power storage device that includes the positive electrode coating, and a power storage device with low direct-current resistance.

The details of the mechanism of the effects of the present disclosure are not fully clear, but can be assumed as follows.

The acrylic polymer (A) may be adsorbed on the carbon material-based conductive materials by the hydrocarbon group having 8 to 30 carbon atoms to increase the dispersibility of the conductive materials. The acrylic polymer (A) does not cover the entire surface of each of the carbon material-based conductive materials, leaving some portions of the surface exposed. Adjacent carbon material-based conductive materials aggregate in an organic solvent due to a $\pi$-$\pi$ interaction and a hydrogen bond between polar groups that are partially present on the surfaces of the respective conductive materials. In the present disclosure, the compound (B) interacts with the polar groups (neutralization reaction or dipole interaction), and thus reduces the hydrogen bond between the carbon material-based conductive materials. Moreover, the amine (cation) interacts with $\pi$ electrons on the carbon material-based conductive materials (cation-$\pi$ interaction), and thus reduces the $\pi$-$\pi$ interaction between the carbon material-based conductive materials. Since both the hydrogen bond and the $\pi$-$\pi$ interaction are reduced, the dispersibility of the carbon material-based conductive materials can be improved, resulting in lower viscosity compared to the case where the compound (B) is not used.

The mechanism for reducing the resistance value of the positive electrode coating and the direct-current resistance value of the power storage device can be assumed as follows. The acrylic polymer (A) and the compound (B) each interact with the carbon material-based conductive materials. In other words, both of them are adsorbed on the surfaces of the carbon material-based conductive materials. Although the acrylic polymer (A) would be adsorbed in a patchy fashion, the combination of the acrylic polymer (A) with the compound (B) causes competitive adsorption between them on the surfaces of the carbon material-based conductive materials. Consequently, each of the adsorbed acrylic polymer (A) and compound (B) is localized on the surface of the individual conductive materials. The adsorption area of the acrylic polymer (A) is smaller in the presence of the compound (B) than in the absence of the compound (B). The compound (B) vaporizes with the organic solvent as the positive electrode paste is applied and dried. At this time, the portions of the surfaces of the conductive materials on which the compound (B) has been adsorbed are exposed, and the exposed portions serve as conductive contacts between the carbon material-based conductive materials. In the present disclosure, more exposed portions can be obtained than those obtained without the use of the compound (B). This may facilitate the formation of a conductive path, which in turn may reduce the resistance value of the positive electrode coating and the direct-current resistance value of the power storage device.

The compound (B) that can achieve the above effects in the present invention is required to have a boiling point lower than the boiling point (202° C.) of N-methyl-2-pyrrolidone, which is mainly used as a solvent of the positive electrode paste, because the compound (B) needs to vaporize with the solvent during drying of the positive electrode paste. It is also required that the compound (B) be less likely to form a covalent bond with, e.g., a carboxyl group or a hydroxyl group that is present on the surfaces of the carbon material-based conductive materials. Therefore, when the compound (B) is aliphatic, a secondary amine and a tertiary amine are preferable to a primary amine. The compound (B) is more preferably an aromatic amine, which has a bulkier structure than the aliphatic amine, and further preferably a heterocyclic amine.

However, the present disclosure should not be construed as being limited to these mechanisms.

<Acrylic Polymer (A)>

The acrylic polymer (A) contained in the dispersant composition of the present disclosure (also referred to as an "acrylic polymer (A) of the present disclosure" in the following) contains a constitutional unit a, as will be described below. In one or more embodiments, the acrylic polymer (A) preferably contains at least one selected from the group consisting of a constitutional unit b1 and a constitutional unit b2 (which are also collectively referred to as a "constitutional unit b" in the following), and more preferably further contains a constitutional unit c from the viewpoint of improving the dispersibility of the carbon material-based conductive materials. The constitutional units b1, b2, and c will be described below. In one or more embodiments, the acrylic polymer (A) may be, e.g., a polymer containing the constitutional unit a, a copolymer containing the constitutional unit a and the constitutional unit b, or a copolymer containing the constitutional unit a, the constitutional unit b, and the constitutional unit c. The acrylic polymer (A) may be of one type or a combination of two or more types.

(Constitutional Unit a)

The constitutional unit a is a constitutional unit represented by the following formula (1). The constitutional unit a may be of one type or a combination of two or more types. In the present disclosure, the constitutional unit a is a component of the acrylic polymer (A) that is to be adsorbed on the surfaces of the carbon material-based conductive materials.

[Chemical Formula 2]

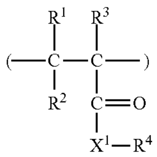

(1)

In the formula (1), $R^1$, $R^2$, and $R^3$ are the same as or different from each other and represent a hydrogen atom, a methyl group, or an ethyl group, $X^1$ represents a nitrogen atom or an oxygen atom, and $R^4$ represents a hydrocarbon group having 8 to 30 carbon atoms.

In the formula (1), $R^1$ and $R^2$ are each preferably a hydrogen atom, $R^3$ is preferably a hydrogen atom or a methyl group, and more preferably a methyl group, and $X^1$ is preferably an oxygen atom from the viewpoint of improving the adsorbability of the acrylic polymer (A) on the surfaces of the carbon material-based conductive materials.

The hydrocarbon group of $R^4$ is preferably an alkyl group or an alkenyl group, and more preferably an alkyl group from the viewpoint of improving the adsorbability of the acrylic polymer (A) on the surfaces of the carbon material-based conductive materials. From the same viewpoint, the carbon number of $R^4$ is 8 or more, preferably 10 or more, more preferably 12 or more, even more preferably 14 or more, and further preferably 16 or more. From the same viewpoint, the carbon number of $R^4$ is 30 or less, preferably 24 or less, more preferably 22 or less, and further preferably 20 or less. From the same viewpoint, examples of $R^4$ include an octyl group, a 2-ethylhexyl group, a decyl group, a lauryl group, a myristyl group, a cetyl group, a stearyl group, an oleyl group, and a behenyl group.

In one or more embodiments, examples of the monomer that forms the constitutional unit a (also referred to as a "monomer a" in the following) include the following: ester compounds such as 2-ethylhexyl (meth)acrylate, octyl (meth)acrylate, lauryl (meth)acrylate, stearyl (meth)acrylate, isostearyl (meth)acrylate, and behenyl (meth)acrylate; and amide compounds such as 2-ethylhexyl (meth)acrylamide, octyl (meth)acrylamide, lauryl (meth)acrylamide, stearyl (meth)acrylamide, and behenyl (meth)acrylamide. Among them, the monomer a is preferably at least one selected from lauryl (meth)acrylate, stearyl (meth)acrylate, or behenyl (meth)acrylate, more preferably at least one selected from stearyl (meth)acrylate or behenyl (meth)acrylate, even more preferably at least one selected from stearyl methacrylate (SMA) or behenyl acrylate (BeA), and further preferably stearyl methacrylate from the viewpoint of improving the dispersibility of the carbon material-based conductive materials and facilitating the introduction of the constitutional unit a into the acrylic polymer.

The content of the constitutional unit a in all the constitutional units of the acrylic polymer (A) is preferably 10% by mass or more, more preferably 15% by mass or more, even more preferably 20% by mass or more, still more preferably 25% by mass or more, and further preferably 30% by mass or more from the viewpoint of improving the adsorbability of the acrylic polymer (A) on the surfaces of the carbon material-based conductive materials and improving the dispersibility of the carbon material-based conductive materials. From the same viewpoint, the content of the constitutional unit a is preferably 80% by mass or less, more preferably 75% by mass or less, even more preferably 70% by mass or less, still more preferably 60% by mass or less, and further preferably 50% by mass or less. When the constitutional unit a is a combination of two or more types, the content of the constitutional unit a is the total content of the two or more types.

In the present disclosure, the content of the constitutional unit a in all the constitutional units of the acrylic polymer (A) can be considered as the ratio of the amount of the monomer a used to the total amount of the monomers used for polymerization.

(Constitutional Unit b)

The constitutional unit b is at least one constitutional unit selected from the group consisting of a constitutional unit b1 represented by the following formula (2) and a constitutional unit b2 represented by the following formula (3). The constitutional unit b may be of one type or a combination of two or more types. In the present disclosure, the constitutional unit b is a component of the acrylic polymer (A) that is not adsorbed on the surfaces of the carbon material-based conductive materials, but contributes to steric repulsion. The acrylic polymer (A) preferably contains the constitutional unit b2 as the constitutional unit b from the viewpoint of improving the dispersibility due to steric repulsion.

[Chemical Formula 3]

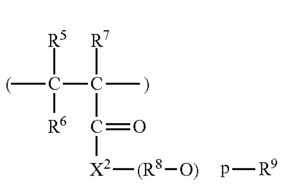

(2)

In the formula (2), $R^5$, $R^6$, and $R^7$ are the same as or different from each other and represent a hydrogen atom, a methyl group, or an ethyl group, $X^2$ represents a nitrogen atom or an oxygen atom, $R^8$ represents an alkylene group having 2 to 4 carbon atoms, p represents 1 or more and 8 or less, and $R^9$ represents a hydrogen atom or a methyl group.

In the formula (2), $R^5$ and $R^6$ are each preferably a hydrogen atom, $R^7$ is preferably a hydrogen atom or a methyl group, and more preferably a methyl group, $X^2$ is preferably an oxygen atom, and p is preferably 1 or more and also preferably 5 or less, and more preferably 3 or less from the viewpoint of improving the dispersibility due to steric repulsion.

[Chemical Formula 4]

(3)

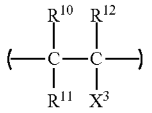

In the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms.

The constitutional unit b1 represented by the formula (2) may be of one type or a combination of two or more types. The constitutional unit b1 may have, e.g., a structure derived from a nonionic monomer or a structure into which a nonionic group is introduced after polymerization. Examples of the monomer that forms the constitutional unit b1 (also referred to as a "monomer b1" in the following) include the following: 2-hydroxyethyl methacrylate, methoxyethyl methacrylate, methoxy polyethylene glycol (meth)acrylate, methoxy poly(ethylene glycol/propylene glycol) mono(meth)acrylate, ethoxy polyethylene glycol/propylene glycol) mono(meth)acrylate, polyethylene glycol mono(meth)acrylate, and polypropylene glycol mono(meth) acrylate. Among them, the monomer b1 is preferably at least one selected from 2-hydroxyethyl methacrylate (HEMA), methoxy polyethylene glycol (meth)acrylate (PEGMA), or methoxyethyl methacrylate (MEA), more preferably at least one selected from 2-hydroxyethyl methacrylate (HEMA), methoxy polyethylene glycol methacrylate with an average number of moles of ethylene oxide added of 1 to 3 (PEGMA (EO1 to EO3)), methoxy polyethylene glycol methacrylate with an average number of moles of ethylene oxide added of 2 (PEGMA (EO2), or methoxyethyl methacrylate (MEA), and further preferably at least one selected from 2-hydroxyethyl methacrylate (HEMA) or methoxy polyethylene glycol methacrylate with an average number of moles of ethylene oxide added of 2 (PEGMA (EO2) from the viewpoint of steric repulsion and the solubility of the acrylic polymer (A) in an organic solvent. The monomer b1 may be of one type or a combination of two or more types.

(Constitutional Unit b2)

The constitutional unit b2 represented by the formula (3) may be of one type or a combination of two or more types. The monomer that forms the constitutional unit b2 represented by the formula (3) (also referred to as a "monomer b2" in the following) in the synthesis of the acrylic polymer (A) is preferably at least one selected from 4-vinylpyridine (4-Vpy), 2-vinylpyridine (2-Vpy), acrylonitrile (AN), or methacrylonitrile (MAN), more preferably at least one selected from 4-vinylpyridine (4-Vpy) or acrylonitrile (AN), and further preferably acrylonitrile (AN) from the viewpoint of steric repulsion and the solubility of the acrylic polymer (A) in an organic solvent. The monomer b2 may be of one type or a combination of two or more types.

(Constitutional Unit c)

The constitutional unit c is a constitutional unit represented by the following formula (4). The constitutional unit c may be of one type or a combination of two or more types. In the present disclosure, the constitutional unit c is a component of the acrylic polymer (A) that is not adsorbed on the surfaces of the carbon material-based conductive materials, but contributes to solubility.

[Chemical Formula 5]

(4)

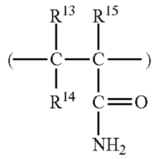

In the formula (4), $R^{13}$, $R^{14}$, and $R^{15}$ are the same as or different from each other and represent a hydrogen atom, a methyl group, or an ethyl group. The monomer that forms the constitutional unit c (also referred to as a "monomer c" in the following) is preferably at least one selected from acrylamide (AAm) or methacrylamide (MAAm), and more preferably methacrylamide (MAAm) from the viewpoint of the solubility of the acrylic polymer (A) in an organic solvent.

When the acrylic polymer (A) of the present disclosure contains the constitutional unit b, the content of the constitutional unit b in all the constitutional units of the acrylic polymer (A) is preferably 20% by mass or more, more preferably 25% by mass or more, and further preferably 30% by mass or more from the viewpoint of improving the dispersibility due to steric repulsion. From the same viewpoint, the content of the constitutional unit b is preferably 80% by mass or less, more preferably 70% by mass or less, even more preferably 60% by mass or less, and further preferably 50% by mass or less. When the constitutional unit b is a combination of two or more types, the content of the constitutional unit b is the total content of the two or more types.

In the present disclosure, the monomer b is a monomer that forms the constitutional unit b in the synthesis of the acrylic polymer (A). The content of the constitutional unit b in all the constitutional units of the acrylic polymer (A) can be considered as the ratio of the amount of the monomer b used to the total amount of the monomers used for polymerization.

When the acrylic polymer (A) of the present disclosure contains the constitutional unit c, the content of the constitutional unit c in all the constitutional units of the acrylic polymer (A) is preferably 5% by mass or more, more preferably 10% by mass or more, even more preferably 15% by mass or more, and further preferably 20% by mass or more from the viewpoint of the solubility of the acrylic polymer (A). From the same viewpoint, the content of the constitutional unit c is preferably 50% by mass or less, more preferably 40% by mass or less, and further preferably 30% by mass or less. When the constitutional unit c is a combination of two or more types, the content of the constitutional unit c is the total content of the two or more types.

In the present disclosure, the content of the constitutional unit c in all the constitutional units of the acrylic polymer (A) can be considered as the ratio of the amount of the monomer c used to the total amount of the monomers used for polymerization.

The acrylic polymer (A) of the present disclosure may further contain another constitutional unit other than the constitutional unit a, the constitutional unit b, and the constitutional unit c as long as the effects of the present disclosure can be achieved. The total content of the constitutional unit a and the constitutional unit b in all the constitutional units of the acrylic polymer (A) is preferably 30% by mass or more, more preferably 45% by mass or more, even more preferably 60% by mass or more, and further preferably 70% by mass or more from the viewpoint of improving the dispersibility of the carbon material-based conductive materials. Furthermore, the total content of the constitutional unit a and the constitutional unit b is preferably 100% by mass or less, more preferably 95% by mass or less, even more preferably 90% by mass or less, and further preferably 85% by mass or less from the viewpoint of improving the dispersibility of the carbon material-based conductive materials.

When the acrylic polymer (A) of the present disclosure is a copolymer containing the constitutional unit a, the constitutional unit b, and the constitutional unit c, from the viewpoint of improving the dispersibility of the carbon material-based conductive materials, the preferred combinations of the constitutional units a, b, and c are as follows.

SMA/HEMA/MAAm
SMA/HEMA/AAm
SMA/PEGMA (EO1)/MAAm
SMA/PEGMA (EO2)/MAAm
SMA/2-Vpy/MAAm
SMA/4-Vpy/MAAm
SMA/4-Vpy/AAm
SMA/AN/MAAm
BeA/AN/MAAm

When the acrylic polymer (A) of the present disclosure is a copolymer containing the constitutional unit a, the constitutional unit b, and the constitutional unit c, the arrangement of the constitutional unit a, the constitutional unit b, and the constitutional unit c can take any form of random, block, or graft.

<Production Method of Acrylic Polymer>

The synthesis method of the acrylic polymer (A) of the present disclosure is not particularly limited and may be any method that is usually used for the polymerization of (meth) acrylic acid esters and vinyl monomers. Examples of the synthesis method of the acrylic polymer (A) include a free radical polymerization method, a living radical polymerization method, an anionic polymerization method, and a living anionic polymerization method. For example, when the free radical polymerization method is used, the acrylic polymer (A) can be obtained by a known method such as solution polymerization of monomer components containing the monomer a and optionally the monomers b, c.

Examples of the solvent used in the above polymerization include organic solvents such as hydrocarbons (hexane and heptane), aromatic hydrocarbons (toluene, xylene, etc.), lower alcohols (ethanol, isopropanol, etc.), ketones (acetone and methyl ethyl ketone), ethers (tetrahydrofuran and diethylene glycol dimethyl ether), and N-methylpyrrolidone. The amount of the solvent is preferably 0.5 to 10 times the total amount of the monomers in terms of mass ratio. The polymerization initiator used in the above polymerization may be any known radical polymerization initiator. Examples of the polymerization initiator include azo polymerization initiators, hydroperoxides, dialkyl peroxides, diacyl peroxides, and ketone peroxides. The amount of the polymerization initiator is preferably 0.01 mol % or more, more preferably 0.05 mol % or more, and further preferably 0.1 mol % or more with respect to the total amount of the monomer components. Furthermore, the amount of the polymerization initiator is preferably 5 mol % or less, more preferably 4 mol % or less, and further preferably 3 mol % or less with respect to the total amount of the monomer components. The polymerization reaction is preferably performed at a temperature of 40° C. or more and 180° C. or less under a nitrogen flow, and the reaction time is preferably 0.5 hours or more and 20 hours or less.

Moreover, any known chain transfer agent may be used in the above polymerization. Examples of the chain transfer agent include isopropyl alcohol and a mercapto compound such as mercaptoethanol.

In the present disclosure, the content of the constitutional unit a in all the constitutional units of the acrylic polymer (A) can be considered as the ratio of the amount of the monomer a used to the total amount of the monomers used for polymerization. The content of the constitutional unit b in all the constitutional units of the acrylic polymer (A) can be considered as the ratio of the amount of the monomer b used to the total amount of the monomers used for polymerization. The total content of the constitutional unit a and the constitutional unit b in all the constitutional units of the acrylic polymer (A) can be considered as the ratio of the total amount of the monomer a and the monomer b used to the total amount of the monomers used for polymerization.

The weight average molecular weight of the acrylic polymer (A) of the present disclosure is preferably 5000 or more, more preferably 7000 or more, and further preferably 10000 or more from the viewpoint of improving the dispersibility of the carbon material-based conductive materials and the solubility of the acrylic polymer in an organic solvent. From the same viewpoint, the weight average molecular weight of the acrylic polymer (A) is preferably 1000000 or less, more preferably 500000 or less, even more preferably 300000 or less, still more preferably 200000 or less, yet more preferably 100000 or less, and further preferably 50000 or less. In the present disclosure, the weight average molecular weight is a value measured by GPC (gel permeation chromatography), and the details of the measurement conditions will be described in Examples.

The content of the acrylic polymer (A) in the dispersant composition of the present disclosure is preferably 5% by mass or more, more preferably 10% by mass or more, and further preferably 15% by mass or more from the viewpoint of improving the dispersibility of the carbon material-based conductive materials. Furthermore, the content of the acrylic polymer (A) is preferably 50% by mass or less, more preferably 40% by mass or less, and further preferably 30% by mass or less from the viewpoint of the solubility of the acrylic polymer (A) in an organic solvent. When the acrylic polymer (A) is a combination of two or more types, the content of the acrylic polymer (A) is the total content of the two or more types.

<Compound (B)>

The amine compound (B) with a boiling point of 200° C. or less contained in the dispersant composition of the present disclosure (also referred to as a "compound (B) of the present disclosure" in the following) is at least one selected from the group consisting of a secondary aliphatic amine, a tertiary aliphatic amine, an aromatic amine, and a heterocyclic amine that are strongly basic, from the viewpoint of the interaction of the amine compound (B) with the carbon material-based conductive materials and the adsorbability of the amine compound (B) on the surfaces of the carbon material-based conductive materials. The boiling point of the compound (B) of the present disclosure is 200° C. or less, preferably not more than the boiling point of a solvent of the positive electrode paste, more preferably not more than the boiling point (202° C.) of N-methylpyrrolidone (NMP), which is often used as a solvent of the positive electrode paste, and further preferably 190° C. or less for recycling of NMP. The lower limit of the boiling point of the compound (B) of the present disclosure is preferably 100° C. or more, and more preferably 120° C. or more from the viewpoint of ease of handling.

Due to the "cation-π" interaction on the surfaces of the carbon material-based conductive materials, the amine compound can block the π-π interaction between the carbon material-based conductive materials and reduce the viscosity of the conductive material slurry. However, if the amine compound with electrical insulation properties remains in the positive electrode coating, the resistance value of the positive electrode coating and the direct current resistance value of the power storage device such as a lithium ion battery will be increased. For this reason, the amine compound (B) of the present disclosure may be a tertiary aliphatic amine, a tertiary aromatic amine, or a tertiary heterocyclic amine, which are not amidated and have a boiling point lower than the boiling point (202° C.) of NMP that is mainly used for the positive electrode paste. Alternatively, the amine compound (B) may be a secondary aliphatic amine, a secondary aromatic amine, or a secondary heterocyclic amine, which are not easily amidated because of their large steric hindrance and have a boiling point lower than the boiling point (202° C.) of NMP. Thus, the amine compound (B) vaporizes well with the solvent during drying of the coating, and it is expected that an increase in the above resistance values caused by the addition of the amide compound can be prevented. In order for the "cation-π" interaction to take place effectively, the secondary aliphatic amine is preferably an amine compound with no hydroxyl group, the tertiary aliphatic amine is preferably an amine compound with no hydroxyl group, the aromatic amine is an amine compound with no hydroxyl group, and the heterocyclic amine is an amine compound with no hydroxyl group.

Examples of the compound (B) of the present disclosure include one or more amine compounds selected from the following: secondary aliphatic amines such as dibutylamine (159° C.: hereinafter, the value in parentheses indicates a boiling point), dihexylamine (193° C.), N-methylcyclohexylamine (148° C.), and N-ethylcyclohexylamine (164° C.); tertiary aliphatic amines such as tripropylamine (156° C.), dimethyloctylamine (195° C.), and dimethylcyclohexylamine (160° C.); primary aromatic amines such as benzylamine (185° C.); secondary aromatic amines such as N-methylbenzylamine (186° C.) and N-monomethylaniline (196° C.); tertiary aromatic amines such as N,N-dimethylbenzylamine (183° C.), N,N-dimethylaniline (194° C.), and N,N-dimethyl-o-toluidine (186° C.); and heterocyclic amines such as N-methylmorpholine (116° C.), N-ethylmorpholine (135° C.), and 4-isobutylmorpholine (167° C.). Among them, the compound (B) is preferably at least one selected from dibutylamine, dihexylamine, tripropylamine, N-methylcyclohexylamine, benzylamine, N-methylbenzylamine, N,N-dimethylbenzylamine, N-methylmorpholine, or N-ethylmorpholine, more preferably at least one selected from tripropylamine, dihexylamine, N,N-dimethylbenzylamine, N-methylbenzylamine, benzylamine, or N-ethylmorpholine, even more preferably at least one selected from tripropylamine, dihexylamine, benzylamine, or N-ethylmorpholine, and further preferably at least one selected from dihexylamine, benzylamine, or N-ethylmorpholine from the viewpoint of improving the dispersibility of the carbon material-based conductive materials, reducing the viscosities of the conductive material slurry and the positive electrode paste, and reducing the resistance value of the positive electrode coating and the direct-current resistance value of the power storage device.

In one or more embodiments, the content of the compound (B) in the dispersant composition of the present disclosure is preferably 10 parts by mass or more, more preferably 20 parts by mass or more, even more preferably 30 parts by mass or more, still more preferably 50 parts by mass or more, and further preferably 70 parts by mass or more with respect to 100 parts by mass of the acrylic polymer (A) from the viewpoint of the effect of reducing the viscosities of the conductive material slurry and the positive electrode paste. Furthermore, the content of the compound (B) is preferably 300 parts by mass or less, more preferably 250 parts by mass or less, even more preferably 200 parts by mass or less, and further preferably 150 parts by mass or less with respect to 100 parts by mass of the acrylic polymer (A) from the viewpoint of the solubility of the acrylic polymer (A).

The mass ratio (acrylic polymer (A)/compound (B) of the acrylic polymer (A) to the compound (B) in the dispersant composition of the present disclosure is preferably 0.1 or more, more preferably 0.3 or more, even more preferably 0.5 or more, and further preferably 0.7 or more from the viewpoint of improving the dispersibility of the carbon material-based conductive materials. Furthermore, the mass ratio is preferably 10 or less, more preferably 5 or less, even more preferably 3 or less, and further preferably 1.5 or less from the viewpoint of high conductive properties.

<Organic Solvent (C)>

In one or more embodiments, the dispersant composition of the present disclosure may further contain an organic solvent (C). The organic solvent (C) is preferably an organic solvent that is able to dissolve a binder (binder resin) contained in the positive electrode paste. Examples of the organic solvent (C) include the following: amide-based polar organic solvents such as dimethylformamide (DMF), diethylformamide, dimethylacetamide (DMAc), and N-methylpyrrolidone (NMP); alcohols such as hexanol, heptanol, and octanol; glycols such as ethylene glycol, diethylene glycol, triethylene glycol, propylene glycol, 1,3-propanediol, 1,3-butanediol, 1,5-pentanediol, and hexylene glycol; polyhydric alcohols such as glycerol, trimethylolpropane, pentaerythritol, and sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; ketones such as acetone, methyl ethyl ketone, methyl propyl ketone, and cyclopentanone; esters such as ethyl acetate, γ-butyrolactone, and ε-propiolactone; and dimethyl sulfoxide (DMSO). The organic solvent (C) may be of one type or a combination of two or more types. In particular, the organic solvent (C) is preferably N-methylpyrrolidone (NMP), dimethylformamide (DMF), or dimethyl sulfoxide (DMSO), and more preferably N-methylpyrrolidone (NMP) from the viewpoint of the solubility of the binder resin.

In one or more embodiments, the content of the organic solvent (C) in the dispersant composition of the present disclosure is preferably 30% by mass or more, more preferably 50% by mass or more, and further preferably 55% by mass or more from the viewpoint of the solubility of the acrylic polymer (A). Furthermore, the content of the organic solvent (C) is preferably 80% by mass or less, more preferably 78% by mass or less, and further preferably 75% by mass or less from the viewpoint of uniform solubility of the acrylic polymer (A) and the compound (B).

The dispersant composition of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder (i.e., a binder resin with a structure different from the acrylic polymer (A)).

[Conductive Material Slurry]

An aspect of the present disclosure relates to a conductive material slurry (also referred to as a "conductive material slurry of present disclosure" in the following). The conductive material slurry of the present disclosure contains carbon material-based conductive materials (D) and the dispersant composition of the present disclosure. In this aspect, the preferred embodiments of the dispersant composition of the present disclosure are as described above. In one or more embodiments, the conductive material slurry of the present disclosure contains the acrylic polymer (A) of the present disclosure, the amine compound (B) of the present disclosure, the organic solvent (C), and the carbon material-based conductive materials (D) (also referred to as "carbon material-based conductive materials (D) of the present disclosure" in the following), as will be described below.

<Carbon Material-Based Conductive Material (D)>

In one or more embodiments, examples of the carbon material-based conductive materials (D) of the present disclosure include carbon nanotubes (also referred to as "CNTs" in the following), carbon black, graphite, and graphene. Among them, the carbon material-based conductive materials (D) are preferably at least one selected from carbon black, carbon nanotubes, or graphene from the viewpoint of achieving high conductive properties. From the same viewpoint, the carbon material-based conductive materials (D) are more preferably carbon nanotubes or graphene, and further preferably carbon nanotubes. The carbon material-based conductive materials (D) may be of one type or a combination of two or more types.

(Carbon Nanotube)

The average diameter of the carbon nanotubes (CNTs) that can be used as the carbon material-based conductive materials (D) of the present disclosure is not particularly limited and is preferably 2 nm or more, more preferably 3 nm or more, and further preferably 5 nm or more from the viewpoint of improving the dispersibility of the CNTs. Furthermore, the average diameter of the CNTs is preferably 100 nm or less, more preferably 70 nm or less, and further preferably 50 nm or less from the viewpoint of improving the conductive properties. In the present disclosure, the average diameter of the CNTs may be measured with a scanning electron microscope (SEM) or an atomic force microscope (AFM).

The carbon nanotubes (CNTs) that can be used as the carbon material-based conductive materials (D) may include two or more types with different diameters in order to achieve both the conductive properties and the dispersibility. When the CNTs are of two or more types with different diameters, the average diameter of the relatively thin CNTs is preferably 2 nm or more, more preferably 3 nm or more, and further preferably 5 nm or more from the viewpoint of the dispersibility. Furthermore, the average diameter of the relatively thin CNTs is preferably 29 nm or less, more preferably 25 nm or less, and further preferably 20 nm or less from the viewpoint of the conductive properties. On the other hand, the average diameter of the relatively thick CNTs is preferably 30 nm or more, more preferably 35 nm or more, and further preferably 40 nm or more from the viewpoint of the dispersibility. Furthermore, the average diameter of the relatively thick CNTs is preferably 100 nm or less, more preferably 70 nm or less, and further preferably 50 nm or less from the viewpoint of the conductive properties.

In the present disclosure, the carbon nanotubes (CNTs) mean the whole of a plurality of types of carbon nanotubes. The form of the CNTs used for the preparation of the conductive material slurry of the present disclosure is not particularly limited. For example, a plurality of types of CNTs may be present independently or may be bundled or entangled with each other. Alternatively, these forms of CNTs may be combined together. The CNTs may have various number of layers or various diameters. The CNTs may contain impurities (such as a catalyst and amorphous carbon) derived from the process of producing the CNTs.

In one or more embodiments, each of the carbon nanotubes (CNTs) that can be used as the carbon material-based conductive materials (D) is a single sheet of graphite rolled into a cylinder. The CNTs include a single-walled carbon nanotube (SW carbon nanotube) consisting of a single layer of graphite, a double-walled carbon nanotube (DW carbon nanotube) consisting of two layers of graphite, and a multi-walled carbon nanotube (MW carbon nanotube) consisting of three or more layers of graphite. Any of the single, double-, and multi-walled carbon nanotubes and a mixture of them can be used depending on the properties required for a positive electrode coating, which is formed by using the positive electrode paste for a power storage device that contains the carbon nanotubes. The positive electrode coating is a film-like layer obtained by applying the positive electrode paste to an electrode substrate (current collector).

Examples of the CNTs that can be used as the carbon material-based conductive materials (D) include the following: NC-7000 (9.5 nm: hereinafter, the number in parentheses indicates an average diameter) and NX7100 (10 nm) manufactured by Nanocyl SA: FT6100 (9 nm), FT-6110 (9 nm), FT-6120 (9 nm), FT-7000 (9 nm), FT-7010 (9 nm), FT-7320 (9 nm), FT-9000 (12.5 nm), FT-9100 (12.5 nm), FT-9110 (12.5 nm), FT-9200 (19 nm), and FT-9220 (19 nm) manufactured by Jiangsu Cnano Technology Ltd.; HCNTs4 (4.5 nm), CNTs5 (7.5 nm), HCNTs5 (7.5 nm), GCNTs5 (7.5 nm), HCNTs10 (15 nm), CNTs20 (25 nm), and CNTs40 (40 nm) manufactured by Cabot Performance Materials (Shenzhen) Co., Ltd.; CTUBE 170 (13.5 nm), CTUBE 199 (8 nm), and CTUBE 298 (10 nm) manufactured by Korea CNT Co., Ltd.; K-Nanos 100P (11.5 nm) manufactured by Korea Kumho Petrochemical Co., Ltd.; CP-1001M (12.5 nm) and BT-1003M (12.5 nm) manufactured by LG Chem; and 3003 (10 nm) and 3021 (20 nm) manufactured by Nano-Tech Port Co., Ltd.

Examples of the combination of two types of CNTs include the following: a combination of CNTs40 (40 nm) and HCNTs4 (4.5 nm) or HCNTs5 (7.5 nm) from Cabot Performance Materials (Shenzhen) Co., Ltd.; a combination of CNTs40 (40 nm) and GCNTs5 (7.5 nm); a combination of CNTs40 (40 nm) and FT-7010 (9 nm) from Jiangsu Cnano Technology Ltd.; a combination of CNTs40 (40 nm) and FT-9100 (12.5 nm); and a combination of CNTs40 (40 nm) and BT-1003M (12.5 nm) from LG Chem.

(Carbon Black)

Various types of carbon black, including furnace black, channel black, thermal black, acetylene black, and Ketjen black, can be used as the carbon material-based conductive materials (D) of the present disclosure. In addition, common oxidized carbon black and hollow carbon can also be used. The oxidation of carbon is carried out in such a manner that carbon is treated at a high temperature in the air or secondarily treated with, e.g., nitric acid, nitrogen dioxide, or ozone, so that oxygen-containing polar functional groups such as phenol, quinone, carboxyl, and carbonyl groups are directly introduced (covalently bonded) to the surface of the carbon. This treatment is typically performed to improve the dispersibility of carbon. However, in general, the larger the amount of the functional groups introduced, the lower the conductive properties of carbon. Therefore, carbon that has not been subjected to the oxidation treatment is preferably used.

As the specific surface area of the carbon black that can be used as the carbon material-based conductive materials (D) becomes larger, the points of contact between carbon black particles are increased, which is advantageous in reducing the internal resistance of an electrode. Specifically, the specific surface area (BET) is determined from the amount of nitrogen adsorption, and is preferably 20 $m^2/g$ or more, more preferably 50 $m^2/g$ or more, and further preferably 100 $m^2/g$ or more. Furthermore, the specific surface area (BET) is preferably 1500 $m^2/g$ or less, more preferably 1000 $m^2/g$ or less, and further preferably 800 $m^2/g$ or less.

The primary particle size (diameter) of the carbon black that can be used as the carbon material-based conductive materials (D) is preferably 5 nm or more, and more preferably 10 or more from the viewpoint of the conductive properties. Furthermore, the primary particle size of the carbon black is preferably 1000 nm or less, and more preferably 200 nm or less. In the present disclosure, the primary particle size of the carbon black is the average of the particle sizes measured with, e.g., an electron microscope.

Examples of the carbon black that can be used as the carbon material-based conductive materials (D) include, but are not limited to, the following: TOKABLACK #4300, #4400, #4500, #5500, etc. (manufactured by TOKAI CARBON CO., LTD., furnace black); Printex L etc. (manufactured by Degussa AG, furnace black); Raven 7000, 5750, and 5250, 5000 Ultra III, 5000 Ultra, etc. and Conductex SC Ultra, Conductex 975 Ultra, etc. (manufactured by Columbian Chemicals Co., furnace black); #2350, #2400B, #30050B, #3030B, #3230B, #3350B, #3400B, #5400B, etc. (manufactured by Mitsubishi Chemical Corporation, furnace black); MONARCH 1400, 1300, and 900, VULCAN XC-72R, BLACK PEARLS 2000, etc. (manufactured by Cabot Corporation, furnace black); ENSACO 250G, ENSACO 260G, ENSACO 350G, and SUPER P-Li (manufactured by TIMCAL Ltd.); Ketjen black EC-300J and EC-600JD (manufactured by Akzo Co., Ltd.); and DENKA BLACK, DENKA BLACK HS-100, FX-35, Li-100, Li-250, Li-400, and Li-435 (manufactured by DENKI KAGAKU KOGYO KABUSHIKI KAISHA, acetylene black).

(Graphene)

The graphene that can be used as the carbon material-based conductive materials (D) of the present disclosure generally refers to a sheet of $sp^2$-bonded carbon atoms with a thickness of one atom (i.e., single-layer graphene). In the present disclosure, the graphene also includes a flaky substance having a layered structure of single-layer graphene sheets.

The thickness of the graphene that can be used as the carbon material-based conductive materials (D) is not particularly limited and is preferably 100 nm or less, more preferably 50 nm or less, and further preferably 20 nm or less. The size of a graphene sheet in the direction parallel to the graphene layer is not particularly limited. However, a conductive path per graphene becomes shorter when the graphene is too small. This may lead to poor conductive properties due to the influence of contact resistance between graphene sheets. Therefore, the graphene of the present disclosure is preferably larger than a certain degree. The size of a graphene sheet in the direction parallel to the graphene layer is preferably 0.5 μm or more, more preferably 0.7 μm or more, and further preferably 1 μm or more. In this case, the size of a graphene sheet in the direction parallel to the graphene layer means the average of the maximum diameter and the minimum diameter of the graphene sheet when observed in the direction perpendicular to the plane direction of the graphene sheet.

The content of the carbon material-based conductive materials (D) in the conductive material slurry of the present disclosure is preferably 1% by mass or more, more preferably 2% by mass or more, and further preferably 3% by mass or more from the viewpoint of improving the convenience of adjusting the concentration of the positive electrode paste. Furthermore, the content of the carbon material-based conductive materials (D) is preferably 10% by mass or less, more preferably 8% by mass or less, and further preferably 7% by mass or less from the viewpoint of making the viscosity of the conductive material slurry suitable for easy handling.

<Acrylic Polymer (A) in Conductive Material Slurry>

The content of the acrylic polymer (A) in the conductive material slurry of the present disclosure is preferably 0.1 part by mass or more, more preferably 1 part by mass or more, even more preferably 5 parts by mass or more, and further preferably 10 parts by mass or more with respect to 100 parts by mass of the carbon material-based conductive materials (D) from the viewpoint of improving the dispersibility of the carbon material-based conductive materials (D). Furthermore, the content of the acrylic polymer (A) is preferably 200 parts by mass or less, more preferably 100 parts by mass or less, even more preferably 50 parts by mass or less, and further preferably 30 parts by mass or less with respect to 100 parts by mass of the carbon material-based conductive materials (D) from the viewpoint of high conductive properties.

<Compound (B) in Conductive Material Slurry>

The content of the compound (B) in the conductive material slurry of the present disclosure is preferably 0.5 part by mass or more, more preferably 1.0 part by mass or more, even more preferably 5 parts by mass or more, and further preferably 10 parts by mass or more with respect to 100 parts by mass of the carbon material-based conductive materials (D) from the viewpoint of improving the dispersibility of the carbon material-based conductive materials (D). Furthermore, the content of the compound (B) is preferably 500 parts by mass or less, more preferably 100 parts by mass or less, even more preferably 50 parts by mass or less, and further preferably 30 parts by mass or less with respect to 100 parts by mass of the carbon material-based conductive materials (D) from the viewpoint of high conductive properties.

<Production Method of Conductive Material Slurry>

In one or more embodiments, the conductive material slurry of the present disclosure may be prepared by mixing the dispersant composition and the carbon material-based conductive materials (D) of the present disclosure, and optionally an additional solvent, with a mixing and dispersing machine. The additional solvent may be the same as the organic solvent (C) that can be used for the preparation of the dispersant composition of the present disclosure, as described above. The mixing and dispersing machine may be at least one selected from, e.g., an ultrasonic homogenizer, a vibration mill, a jet mill, a ball mill, a bead mill, a sand mill, a roll mill, a homogenizer, a high-pressure homogenizer, an ultrasonic device, an attritor, a dissolver, or a paint shaker. Some of the components of the conductive material slurry may be mixed first, and then the mixture may be blended with the remainder. Moreover, all the components of the conductive material slurry do not have to be added at once, but may be divided and added multiple times. The carbon material-based conductive materials (D) may be in a dry state or may contain a solvent.

In the present disclosure, the viscosity of the conductive material slurry at 25° C. is preferably as low as possible. When the content of the carbon material-based conductive materials (D) is 5% by mass, e.g., the viscosity of the conductive material slurry at 25° C. is preferably 0.05 Pa·s or more, more preferably 0.1 Pa·s or more, and further preferably 0.2 Pa·s or more from the viewpoint of sedimentation properties or the like. Furthermore, when the content of the carbon material-based conductive materials (D) is 5% by mass, the viscosity of the conductive material slurry at 25° C. is preferably 50 Pa·s or less, more preferably 20 Pas or less, and further preferably 10 Pa·s or less from the viewpoint of improving the handleability in the preparation of the positive electrode paste.

[Positive Electrode Paste]

An aspect of the present disclosure relates to a positive electrode paste for a power storage device (also referred to as a "positive electrode paste of the present disclosure" in the following). The positive electrode paste of the present disclosure contains the dispersant composition of the present disclosure. In this aspect, the preferred embodiments of the dispersant composition of the present disclosure are as described above. In one or more embodiments, the positive electrode paste of the present disclosure contains the acrylic polymer (A) of the present disclosure, the compound (B) of the present disclosure, the organic solvent (C), and the carbon material-based conductive materials (D).

In one or more embodiments, the positive electrode paste of the present disclosure may further contain a positive electrode active material and a binder.

In one or more embodiments, the positive electrode paste of the present disclosure may further contain conductive materials other than the carbon material-based conductive materials (D). The conductive materials other than the carbon material-based conductive materials (D) include, e.g., conductive polymers such as polyaniline.

<Positive Electrode Active Material>

The positive electrode active material may be any inorganic compound such as a compound with an olivine structure or a lithium transition metal composite oxide. Examples of the compound with an olivine structure include compounds represented by the general formula $Li_xM1_sPO_4$ (where M1 represents a 3d transition metal, $0 \leq x \leq 2$, and $0.8 \leq s \leq 1.2$). The compound with an olivine structure may be coated with, e.g., amorphous carbon. Examples of the lithium transition metal composite oxide include a lithium manganese oxide with a spinel structure and a lithium transition metal composite oxide that has a layered structure and is represented by the general formula $Li_xMO_2$-δ (where M represents a transition metal, $0.4 \leq x \leq 1.2$, and $0 \leq \delta \leq 0.5$). The transition metal M may be, e.g., Co, Ni, or Mn. The lithium transition metal composite oxide may further contain one or more than one element selected from Al, Mn, Fe, Ni, Co, Cr, Ti, Zn, P, or B.

The content of the positive electrode active material in the positive electrode paste of the present disclosure is not particularly limited as long as it can be adjusted in accordance with a suitable viscosity of the positive electrode paste that is applied to a current collector. The content of the positive electrode active material is preferably 40% by mass or more, more preferably 50% by mass or more, and further preferably 60% by mass or more from the viewpoint of the energy density, the stability of the positive electrode paste, and the productivity. Furthermore, the content of the positive electrode active material is preferably 90% by mass or less, more preferably 85% by mass or less, and further preferably 80% by mass or less.

The content of the positive electrode active material in the total solid content of the positive electrode paste of the present disclosure is not particularly limited and may be the same as that of a positive electrode active material in the total solid content of a conventionally known positive electrode paste. The content of the positive electrode active material in the total solid content of the positive electrode paste is preferably 90.0% by mass or more in order to maintain the energy density of a power storage device at a high level, and is also preferably 99.9% by mass or less in order to ensure the conductive properties and coating adhesion properties of a composite layer (coating).

<Binder (Binder Resin)>

The binder (binder resin) may be, e.g., polyvinylidene fluoride (PVDF), a vinylidene fluoride-hexafluoropropylene copolymer, styrene-butadiene rubber, or polyacrylonitrile. These materials may be used alone or in combination of two or more. In particular, the binder is preferably polyvinylidene fluoride (PVDF) or styrene-butadiene rubber, and more preferably polyvinylidene fluoride (PVDF).

The content of the binder in the positive electrode paste of the present disclosure is preferably 0.1% by mass or more, more preferably 0.5% by mass or more, and further preferably 1% by mass or more from the viewpoint of the coating adhesion properties of the composite layer (coating) and the binding properties of the composite layer to a current collector. Furthermore, the content of the binder is preferably 9.95% by mass or less, and more preferably 5% by mass or less from the viewpoint of maintaining the energy density of a power storage device at a high level.

<Acrylic Polymer (A) in Positive Electrode Paste>

The content of the acrylic polymer (A) in the positive electrode paste of the present disclosure is preferably 0.01% by mass or more, more preferably 0.05% by mass or more, and further preferably 0.07% by mass or more from the viewpoint of a low viscosity and coating smoothness of the positive electrode paste. Furthermore, the content of the acrylic polymer (A) is preferably 2.0% by mass or less, more preferably 1.0% by mass or less, even more preferably 0.5% by mass or less, and further preferably 0.3% by mass or less from the viewpoint of reducing the resistance.

<Compound (B) in Positive Electrode Paste>

The content of the compound (B) in the positive electrode paste of the present disclosure is preferably 0.012% by mass or more, and more preferably 0.02% by mass or more from the viewpoint of increasing the solid content concentration of the positive electrode paste and reducing the viscosity of the positive electrode paste. Furthermore, the content of the compound (B) is preferably 0.191% by mass or less, and more preferably 0.1% by mass or less from the viewpoint of the solubility of the binder (binder resin) and the stability of the positive electrode paste.

<Carbon Material-Based Conductive Material (D) in Positive Electrode Paste>

The content of the carbon material-based conductive materials (D) in the positive electrode paste of the present disclosure is preferably 0.01% by mass or more, more preferably 0.05% by mass or more, and further preferably 0.1% by mass or more from the viewpoint of the conducive properties of the composite layer (coating). Furthermore, the content of the carbon material-based conductive materials (D) is preferably 5% by mass or less, more preferably 3% by mass or less, and further preferably 2% by mass or less from the viewpoint of maintaining the energy density of a power storage device at a high level.

In one or more embodiments, the positive electrode paste of the present disclosure can be prepared by mixing the positive electrode active material, the conductive material slurry of the present disclosure, a binder (binder resin) solution, and a solvent (additional solvent) for adjusting the solid content or the like, and then stirring the mixture. Moreover, the mixture may further contain a dispersant other than the acrylic polymer (A) of the present disclosure or a functional material. Examples of the solvent (additional solvent) include non-aqueous solvents such as N-methyl-2-pyrrolidone (NMP), dimethylformamide (DMF), and dimethyl sulfoxide (DMSO) and water. In the preparation of the positive electrode paste, the solvent (additional solvent) is preferably a non-aqueous solvent, and more preferably NMP. For example, a planetary mixer, a bead mill, or a jet mill can be used, optionally in combination, for mixing and stirring.

The positive electrode paste of the present disclosure can also be prepared by premixing some of the components that are used to prepare the positive electrode paste, and then blending the mixture with the remainder. Moreover, all the components of the positive electrode paste do not have to be added at once, but may be divided and added multiple times. This can reduce the mechanical load on the stirring device.

The solid content concentration of the positive electrode paste of the present disclosure, the amount of the positive electrode active material, the amount of the binder, the amount of the conductive material slurry, the amount of the additive components, and the amount of the solvent can be adjusted in accordance with a suitable viscosity of the positive electrode paste that is applied to a current collector. The amount of the solvent is preferably as small as possible from the viewpoint of drying properties. However, the viscosity of the positive electrode paste should not be too high from the viewpoint of the uniformity and surface smoothness of a positive electrode composite layer (coating). On the other hand, the viscosity of the positive electrode paste should not be too low from the viewpoint of preventing it from drying out and ensuring a sufficient thickness of the composite layer (coating).

It is preferable that the positive electrode paste of the present disclosure can be adjusted to a high concentration from the viewpoint of production efficiency. However, a significant increase in the viscosity of the positive electrode paste is not preferred in terms of workability. The use of additives can maintain a suitable viscosity range while keeping a high concentration of the positive electrode paste.

<Production Method of Positive Electrode Paste>

In one or more embodiments, a method for producing a positive electrode paste of the present disclosure may include mixing the carbon material-based conductive material slurry of the present disclosure, the binder, the solvent, and the positive electrode active material. These components may be mixed in any order. In one or more embodiments, the positive electrode paste may also be produced in the following manner. The conductive material slurry of the present disclosure, the solvent, and the binder are mixed and dispersed until the mixture becomes homogeneous. Then, this mixture is blended with the positive electrode active material, and stirred until they become homogeneous. The order of adding the components is not limited to the above. The compound (B) may be added separately from the acrylic polymer (A) during the preparation of the positive electrode paste.

Each of the conductive material slurry and the positive electrode paste of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder.

[Production Method of Positive Electrode Coating or Positive Electrode for Power Storage Device]

An aspect of the present disclosure relates to a method for producing a positive electrode coating or a positive electrode for a power storage device by using the positive electrode paste of the present disclosure. The positive electrode for a power storage device includes a current collector and a positive electrode coating disposed on the current collector. This aspect includes applying the positive electrode paste of the present disclosure to a current collector, and then drying the positive electrode paste. In this aspect, the preferred embodiments of the positive electrode paste of the present disclosure are as described above. In the production method of the positive electrode coating or the positive electrode for a power storage device of the present disclosure, the positive electrode coating or the positive electrode for a power storage device can be produced by a conventionally known method except for the use of the positive electrode paste of the present disclosure.

The positive electrode coating or the positive electrode for a power storage device may be produced by, e.g., applying the positive electrode paste to a current collector such as aluminum foil, and then drying the positive electrode paste. In other words, the positive electrode coating is a dried body of the applied positive electrode paste. The positive electrode paste may also be subjected to compaction with a pressing machine to increase the density of the positive electrode coating. The positive electrode paste may be applied with, e.g., a die head, a comma reverse roll, a direct roll, or a gravure roll. The applied positive electrode paste may be dried by, e.g., heating, airflow, or infrared radiation, which may be used alone or in combination. The drying of the applied positive electrode paste is performed at a temperature at which the compound (B) and the organic solvent (C) cannot be present in the positive electrode paste after the drying time has passed. The drying temperature is not particularly limited as long as it is equal to or lower than the thermal decomposition temperature of the binder resin in the environment (atmospheric pressure) in which the drying process is performed. The drying temperature is preferably equal to or higher than the boiling point of the compound (B), and more preferably equal to or lower than the boiling point of the organic solvent (C). Specifically, the drying temperature is preferably 60° C. or more, and more preferably 80° C. or more and is also preferably 220° C. or less, and more preferably 200° C. or less under normal pressure. The drying time is preferably 10 minutes or more, and more preferably 20 minutes or more and is also preferably 90 minutes or less, and more preferably 60 minutes or less. The positive electrode can be pressed with, e.g., a roll press machine.

The present disclosure further discloses a dispersant composition for an electrode of a power storage device, a carbon material-based conductive material slurry, a positive electrode paste for a power storage device, a method for producing a positive electrode coating, and a positive electrode for a power storage device (and a method for producing a positive electrode for a power storage device) as follows.

<1> A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1), and the compound (B) is at least one amine compound selected from the group consisting of a secondary aliphatic amine, a tertiary aliphatic amine, an aromatic amine, a secondary aromatic amine, a tertiary aromatic amine, and a heterocyclic amine:

[Chemical Formula 6]

(1)

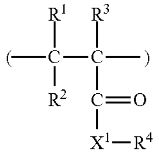

in the formula (1), $R^1$, $R^2$, and $R^3$ are the same as or different from each other and an oxygen atom, and $R^4$ represents a hydrocarbon group having 8 to 30 carbon atoms.

<2> The dispersant composition according to <1>, wherein a monomer that forms the constitutional unit a is at least one selected from the group consisting of lauryl (meth)acrylate, stearyl (meth)acrylate, and behenyl (meth) acrylate, and the compound (B) is at least one amine compound selected from the group consisting of dibutylamine, dihexylamine, tripropylamine, N-methylcyclohexylamine, benzylamine, N-methylbenzylamine, N,N-dimethylbenzylamine, N-methylmorpholine, and N-ethylmorpholine.

<3> A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1) and a constitutional unit b2 represented by the following formula (3), a monomer that forms the constitutional unit a is at least one selected from the group consisting of lauryl (meth) acrylate, stearyl (meth)acrylate, and behenyl (meth) acrylate, and the compound (B) is at least one amine compound selected from the group consisting of dibutylamine, dihexylamine, tripropylamine, N-methylcyclohexylamine, benzylamine, N-methylbenzylamine, N,N-dimethylbenzylamine, N-methylmorpholine, and N-ethylmorpholine:

[Chemical Formula 7]

(1)

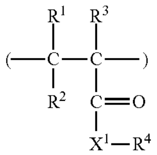

in the formula (1), $R^1$, $R^2$, and $R^3$ are the same as or different from each other and an oxygen atom, and $R^4$ represents a hydrocarbon group having 8 to 30 carbon atoms,

[Chemical Formula 8]

(3)

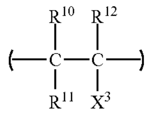

in the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms.

<4> A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1), a constitutional unit b2 represented by the following formula (3), and a constitutional unit c represented by the following formula (4), a monomer that forms the constitutional unit a is at least one selected from the group consisting of lauryl (meth) acrylate, stearyl (meth)acrylate, and behenyl (meth) acrylate, and the compound (B) is at least one amine compound selected from the group consisting of dibutylamine, dihexylamine, tripropylamine, N-methylcyclohexylamine, benzylamine, N-methylbenzylamine, N,N-dimethylbenzylamine, N-methylmorpholine, and N-ethylmorpholine:

[Chemical Formula 9]

(1)

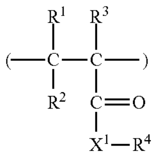

in the formula (1), $R^1$, $R^2$, and $R^3$ are the same as or different from each other and an oxygen atom, and $R^4$ represents a hydrocarbon group having 8 to 30 carbon atoms,

[Chemical Formula 10]

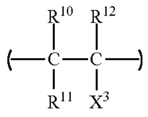

(3)

in the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms,

[Chemical Formula 11]

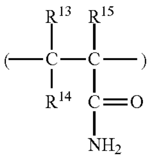

(4)

in the formula (4), $R^{13}$, $R^{14}$, and $R^{15}$ are the same as or different from each other and represent a hydrogen atom, a methyl group, or an ethyl group.

<5> A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1), a constitutional unit b2 represented by the following formula (3), and a constitutional unit c represented by the following formula (4), a monomer that forms the constitutional unit a is stearyl (meth)acrylate, a monomer that forms the constitutional unit b2 is acrylonitrile, a monomer that forms the constitutional unit c is methacrylamide, and the compound (B) is at least one amine compound selected from the group consisting of dihexylamine, tripropylamine, benzylamine, N-methylbenzylamine, N,N-dimethylbenzylamine, and N-ethylmorpholine:

[Chemical Formula 12]

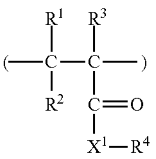

(1)

in the formula (1), $R^1$, $R^2$, and $R^3$ are the same as or different from each other and represent a hydrogen atom, a methyl group, or an ethyl group, $X^1$ represents a nitrogen atom or an oxygen atom, and $R^4$ represents a hydrocarbon group having 8 to 30 carbon atoms,

[Chemical Formula 13]

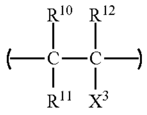

(3)

in the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms,

[Chemical Formula 14]

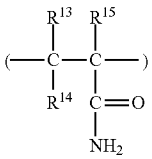

(4)

in the formula (4), $R^{13}$, $R^{14}$, and $R^{15}$ are the same as or different from each other and represent a hydrogen atom, a methyl group, or an ethyl group.

<6> The dispersant composition according to any one of <3> to <5>, wherein a content of the constitutional unit a in all constitutional units of the acrylic polymer (A) is 30% by mass or more and 50% by mass or less, and a content of the constitutional unit b2 in all constitutional units of the acrylic polymer (A) is 30% by mass or more and 50% by mass or less.

<7> The dispersant composition according to any one of <1> to <6>, wherein a weight average molecular weight of the acrylic polymer (A) is 10000 or more and 100000 or less.

<8> A carbon material-based conductive material slurry comprising:

the dispersant composition according to any one of <1> to <7>; and carbon material-based conductive materials (D).

<9> A positive electrode paste for a power storage device, comprising:

the dispersant composition according to any one of <1> to <7>.

<10> A method for producing a positive electrode coating, comprising:

applying the positive electrode paste according to <9> to a current collector; and then drying the positive electrode paste.

<11> A method for producing a positive electrode for a power storage device, the positive electrode comprising a current collector and a positive electrode coating disposed on the current collector, the method comprising:

applying the positive electrode paste according to <9> to a current collector; and then drying the positive electrode paste.

EXAMPLES

Hereinafter, Examples of the present disclosure and Comparative Examples will be described, but the present disclosure is not limited to the following examples.

1. Measurement Method of Each Parameter

[Measurement of Weight Average Molecular Weight of Polymer]

The weight average molecular weight of the polymer was measured by a GPC method. The detailed conditions are as follows.

Measuring device: HLC-8320 GPC (manufactured by Tosoh Corporation)

Column: α-M+α-M (manufactured by Tosoh Corporation)

Column temperature: 40° C.

Detector: differential refractometer

Eluent: N,N-dimethylformamide (DMF) solution containing 60 mmol/L of $H_3PO_4$ and 50 mmol/L of LiBr Flow rate: 1 ml/min Standard sample used for calibration curve; polystyrene Sample solution: DMF solution containing 0.5 wt % of solid content of copolymer Amount of sample solution injected: 100 μL

[Measurement of Viscosity of Conductive Material Slurry]

Using a rheometer MCR 302 (manufactured by Anton Paar GmbH) equipped with a parallel plate PP50, the viscosity (25° C.) of the conductive material slurry was measured while the shear rate was increased from 0.1 $s^{-1}$ to 1000 $s^{-1}$ (forward sweep) and then returned from 1000 $s^{-1}$ to 0.1 $s^{-1}$ (backward sweep), and the viscosity at a shear rate of 1 $s^{-1}$ in the backward sweep was determined and shown in Table 5.

[Measurement of Viscosity of Positive Electrode Paste]

Using a rheometer MCR 302 (manufactured by Anton Paar GmbH) equipped with a cone plate (diameter: 50 mm), the viscosity (25° C.) of the positive electrode paste was measured while the shear rate was increased from 0.1 $s^{-1}$ to 1000 $s^{-1}$ (forward sweep) and then returned from 1000 $s^{-1}$ to 0.1 $s^{-1}$ (backward sweep), and the viscosity at a shear rate of 1 $s^{-1}$ in the backward sweep was determined and shown in Table 7.

[Measurement of Resistance Value of Positive Electrode Coating]

The positive electrode paste was dropped on a polyester film and applied uniformly to the polyester film with a 100 μm applicator. The coated polyester film was dried at 100° C. for 1 hour, thus providing a positive electrode coating with a thickness of 40 μm.

The volume resistance value of the positive electrode coating was measured at a limiting voltage of 10 V by using Loresta-GP (manufactured by Mitsubishi Chemical Analytech Co., Ltd.) equipped with a PSP probe. Table 7 shows the results.

[Production of Electrode (Positive Electrode) and Power Storage Device]

Each of the positive electrode pastes in Examples 11 to 17 and Comparative Examples 8 to 14 was applied to a piece of Al foil with a thickness of 20 μm so that the positive electrode capacity was 3 $mAh/cm^2$. Then, the positive electrode paste was dried at 100° C. for 60 minutes with a drier, resulting in an electrode material that included a current collector and a composite layer (positive electrode coating) disposed on the current collector. This positive electrode material was punched to a diameter of 13 mm and pressed to form an electrode (positive electrode). Next, a separator with a diameter of 19 mm and a coin-shaped metallic lithium with a diameter of 15 mm and a thickness of 0.5 mm were placed on the positive electrode. Thus, a 2032 type coin cell (test half-cell) was produced. The electrolyte solution was 1M $LiPF_6$ in EC/DEC (volume ratio)=3/7.

<Measurement of Direct Current Resistance (DCR)>

A 3-cycle charge-discharge test was performed on the test half cells thus produced under the following charge-discharge conditions, where the temperature of each cell was controlled at 30° C. in a thermostat.

(Charge-Discharge Conditions)

30° C., 0.2 C, charge 4.45 V CC/CV 1/10 C cutoff discharge CC 3.0 V cutoff

Next, each of the test half-cells was charged at 0.2 C for 2.5 hours, and then direct current resistance (DCR) was calculated from a voltage drop for 10 seconds when the cell was discharged at 0.2 to 8 C.

2. Preparation of Dispersant Composition

[Raw Material Used]

The details of the acrylic polymer (A) and its raw materials, the compound (B), etc. used in the preparation of dispersant compositions 1 to 17 in Table 3 are described as follows and shown in Tables 1 and 2.

[Raw Material of Acrylic Polymer (A)]

(Monomer a)

SMA: stearyl methacrylate (manufactured by SHIN-NAKAMURA CHEMICAL Co., Ltd., product number: NK-Ester S)

(Monomer b1)

HEMA: 2-hydroxyethyl methacrylate (manufactured by FUJIFILM Wako Pure Chemical Corporation)

PEGMA (EO2): methoxy polyethylene glycol methacrylate (manufactured by SHIN-NAKAMURA CHEMICAL Co., Ltd., product number: NK-Ester M-20G, average number of moles of ethylene oxide added: 2)

(Monomer b2)

AN: acrylonitrile (Monomer c)

MAAm: methacrylamide (manufactured by Tokyo Chemical Industry Co., Ltd.)

[Comparison Substance of Acrylic Polymer (A)]

PVP: polyvinylpyrrolidone (K-30, manufactured by FUJIFILM Wako Pure Chemical Corporation)

[Solvent]

NMP: N-methyl-2-pyrrolidone (manufactured by FUJIFILM Wako Pure Chemical Corporation)

[Polymerization Initiator]

V-65B: 2,2'-azobis(2,4-dimethylvaleronitrile) (manufactured by FUJIFILM Wako Pure Chemical Corporation)

TABLE 1

| Constitutional unit | | Monomer | Formula (1) $R^4$ | Formula (1) $R^1/R^2/R^3$ | Formula (1) $X^1$ | Formula (2) $R^5/R^6/R^7$ | Formula (2) $X^2$ | Formula (2) $R^8$ |
|---|---|---|---|---|---|---|---|---|
| a | $a^1$ | SMA | $C_{18}H_{37}$ | $H/H/CH_3$ | O | | | |
| b1 | $b^{11}$ | HEMA | | | | $H/H/CH_3$ | O | $—CH_2CH_2—$ |
| | $b^{12}$ | PEGMA (EO2) | | | | $H/H/CH_3$ | O | $—CH_2CH_2—$ |
| b 2 | $b^{21}$ | AN | | | | | | |
| c | $c^1$ | MAAm | | | | | | |

| Constitutional unit | | Formula (2) p | Formula (2) $R^9$ | Formula (3) $R^{10}/R^{11}/R^{12}$ | Formula (3) $X^3$ | Formula (4) $R^{13}/R^{14}/R^{15}$ | Formula (4) $X^4$ |
|---|---|---|---|---|---|---|---|
| a | $a^1$ | | | | | | |
| b1 | $b^{11}$ | 1 | H | | | | |
| | $b^{12}$ | 2 | $—CH_3$ | | | | |
| b 2 | $b^{21}$ | | | H/H/H | —C≡N | | |
| c | $c^1$ | | | | | $H/H/CH_3$ | $—CONH_2$ |

TABLE 2

| Amine compound | | Compound name | Amine | Main backbone | Boiling point ° C. |
|---|---|---|---|---|---|
| Compound (B) | E | dihexylamine | secondary | aliphatic | 193 |
| | F | benzylamine | primary | aromatic | 185 |
| | G | tripropylamine | tertiary | aliphatic | 156 |
| | H | N,N-dimethylbenzylamine | tertiary | aromatic | 183 |
| | I | N-ethylmorpholine | tertiary | heterocyclic | 135 |
| | N | N-methylbenzylamine | secondary | aromatic | 186 |
| Comparison substance of compound (B) | J | dioctylamine | secondary | aliphatic | 298 |
| | K | dimethylstearylamine | tertiary | aliphatic | 358 |
| | L | 1-benzylpiperidine | tertiary | aromatic | 282 |
| | M | N-hydroxyethylmorpholine | tertiary | heterocyclic | 222 |

[Example of Synthesis of Acrylic Polymer (A) for Preparation of Dispersant Composition 1 to 5 and 10 to 15]

A mixed solution containing 40 g of SMA (monomer $a^1$), 40 g of acrylonitrile (monomer b21), 20 g of MAAm (monomer cl), and 59.5 g of NMP (solvent) was prepared as a dropping monomer solution. A mixed solution containing 1.28 g of V-65B (polymerization initiator) and 12.8 g of NMP (solvent) was prepared as a dropping initiator solution.

A separable flask equipped with a reflux tube, an agitator, a thermometer, a nitrogen introduction tube, and a dropping funnel was used. The inside of the flask (vessel) was replaced with nitrogen for 1 hour or more. Then, the dropping monomer solution and the dropping initiator solution were each added dropwise to the vessel at 65° C. over 160 minutes. After completion of the dropping, the mixture was stirred for 1 hour while the temperature in the vessel was still maintained at 65° C. Subsequently, the temperature in the vessel was raised to 80° C., and the mixture was further stirred for 2 hours. Next, the mixture was diluted with 42.6 g of NMP (solvent), thereby providing an acrylic polymer (A) solution for the preparation of dispersant compositions 1 to 5 and 10 to 15. The acrylic polymer (A) solution had a non-volatile content of 40% by mass and a weight average molecular weight of 37000.

[Example of Synthesis of Acrylic Polymer (A) for Preparation of Dispersant Composition 6 to 7]

Acrylic polymer (A) solutions for the preparation of dispersant compositions 6 to 7 were obtained in the same manner as described in [Example of synthesis of acrylic polymer (A) for preparation of dispersant composition 1 to 5 and 10 to 15], except that the mass ratios of the monomers used for the synthesis of the acrylic polymers (A) of the dispersant compositions 6 to 7 in the preparation of the dropping monomer solutions were set to the values shown in Table 3, respectively.

[Example of Synthesis of Acrylic Polymer (A) for Preparation of Dispersant Composition 8 to 9]

Acrylic polymer (A) solutions for the preparation of dispersant compositions 8 to 9 were obtained in the same manner as described in [Example of synthesis of acrylic polymer (A) for preparation of dispersant composition 1 to 5 and 10 to 15], except that 3.90 g of V-65B was used in the synthesis of the acrylic polymer (A) of the dispersant composition 8, and 0.49 g of V-65B was used in the synthesis of the acrylic polymer (A) of the dispersant composition 9. [Example of preparation of dispersant composition 1 to 17]

The acrylic polymers (A) or PVP as a comparison substance thereof shown in Table 3, the compounds (B) or comparison substances thereof shown in Tables 2 and 3, and the organic solvent (C) (NMP) shown in Table 3 were mixed uniformly, so that the dispersant compositions 1 to 17 were prepared. Table 3 shows the content (mass %) of each component in each of the dispersant compositions.

TABLE 3

| Dispersant composition | Dispersant (acrylic polymer (A) and comparison substance thereof) | | | | | | | |
|---|---|---|---|---|---|---|---|---|
| | Configuration | | | | Monomer (mass %) | | | |
| | Constitutional unit a | Constitutional unit b1 | Constitutional unit b2 | Constitutional unit c | Monomer a | Monomer b1 | Monomer b2 | Monomer c |
| Composition 1 | $a^1$ | — | $b^{21}$ | $c^1$ | 40 | | 40 | 20 |
| Composition 2 | $a^1$ | — | $b^{21}$ | $c^1$ | 40 | | 40 | 20 |
| Composition 3 | $a^1$ | — | $b^{21}$ | $c^1$ | 40 | | 40 | 20 |
| Composition 4 | $a^1$ | — | $b^{21}$ | $c^1$ | 40 | | 40 | 20 |
| Composition 5 | $a^1$ | — | $b^{21}$ | $c^1$ | 40 | | 40 | 20 |
| Composition 6 | $a^1$ | $b^{11}$ | | $c^1$ | 40 | 40 | | 20 |
| Composition 7 | $a^1$ | $b^{12}$ | | $c^1$ | 40 | 30 | | 30 |
| Composition 8 | $a^1$ | — | $b^{21}$ | $c^1$ | 40 | | 40 | 20 |
| Composition 9 | $a^1$ | — | $b^{21}$ | $c^1$ | 40 | | 40 | 20 |
| Composition 10 | $a^1$ | — | $b^{21}$ | $c^1$ | 40 | | 40 | 20 |
| Composition 11 (Comp. Ex.) | $a^1$ | — | $b^{21}$ | $c^1$ | 40 | | 40 | 20 |
| Composition 12 (Comp. Ex.) | $a^1$ | — | $b^{21}$ | $c^1$ | 40 | | 40 | 20 |
| Composition 13 (Comp. Ex.) | $a^1$ | — | $b^{21}$ | $c^1$ | 40 | | 40 | 20 |
| Composition 14 (Comp. Ex.) | $a^1$ | — | $b^{21}$ | $c^1$ | 40 | | 40 | 20 |
| Composition 15 (Comp. Ex.) | $a^1$ | — | $b^{21}$ | $c^1$ | 40 | | 40 | 20 |
| Composition 16 (Comp. Ex.) | polyvinylpyrrolidone K-30 | | | | | | | |
| Composition 17 (Comp. Ex.) | polyvinylpyrrolidone K-30 | | | | | | | |

| Dispersant composition | Dispersant (acrylic polymer (A) and comparison substance thereof) | | Amine compound (compound (B) and comparison substance thereof) | | Content of amine compound with respect to 100 parts by mass of dispersant | Organic solvent | |
|---|---|---|---|---|---|---|---|
| | Molecular weight (Mw) | Mass % | Type | Mass % | (parts by mass) | Type | Mass % |
| Composition 1 | 37000 | 20 | E | 20 | 100 | NMP | 60 |
| Composition 2 | 37000 | 20 | F | 20 | 100 | NMP | 60 |
| Composition 3 | 37000 | 20 | G | 20 | 100 | NMP | 60 |
| Composition 4 | 37000 | 20 | H | 20 | 100 | NMP | 60 |
| Composition 5 | 37000 | 20 | I | 20 | 100 | NMP | 60 |
| Composition 6 | 33000 | 20 | I | 20 | 100 | NMP | 60 |
| Composition 7 | 29000 | 20 | I | 20 | 100 | NMP | 60 |
| Composition 8 | 12000 | 20 | E | 20 | 100 | NMP | 60 |
| Composition 9 | 97600 | 20 | F | 20 | 100 | NMP | 60 |
| Composition 10 | 37000 | 20 | N | 20 | 100 | NMP | 60 |
| Composition 11 (Comp. Ex.) | 37000 | 20 | — | 0 | 0 | NMP | 80 |
| Composition 12 (Comp. Ex.) | 37000 | 20 | J | 20 | 100 | NMP | 60 |
| Composition 13 (Comp. Ex.) | 37000 | 20 | K | 20 | 100 | NMP | 60 |
| Composition 14 (Comp. Ex.) | 37000 | 20 | L | 20 | 100 | NMP | 60 |
| Composition 15 (Comp. Ex.) | 37000 | 20 | M | 20 | 100 | NMP | 60 |
| Composition 16 (Comp. Ex.) | 40000 | 20 | — | 0 | 0 | NMP | 80 |
| Composition 17 (Comp. Ex.) | 40000 | 20 | E | 20 | 100 | NMP | 60 |

3. Preparation of Conductive Material Slurry 1 to 17 (Example 1 to 10, Comparative Example 1 to 7)

[Conductive Material Used in Preparation of Conductive Material Slurry 1 to 17]

The details of the conductive materials used in the preparation of conductive material slurries 1 to 17 in Table 5 are shown in Table 4.

TABLE 4

| Conductive material | Type of conductive material | Maker | Product name | Average diameter (nm) | Specific surface area ($m^2/g$) |
|---|---|---|---|---|---|
| N | CNT | Cabot* | HCNTs10 | 15 | 200-260 |

*Cabot Performance Materials (Shenzhen) Co., Ltd.

[Example of Preparation of Conductive Material Slurry]

Example 1

First, 5 g of conductive materials N, which are MW carbon nanotubes (HCNTs10 manufactured by Cabot Corporation, average length: 5 to 12 μm (catalog value)) as fibrous carbon nanostructures, were mixed with 5 g of the dispersant composition 1 and 90 g of NMP (additional solvent) to prepare a coarse dispersion. The coarse dispersion was placed in a high-pressure homogenizer (manufactured by Beryu Corporation, product name: "BERYU MINI") equipped with a multi-stage pressure regulator (multi-stage step-down transformer) for applying a back pressure during dispersion. Then, the coarse dispersion was subjected to a dispersion treatment at a pressure of 100 MPa. Specifically, a shear force was applied to the coarse dispersion so that the MW carbon nanotubes were dispersed, while the back pressure was being applied. Thus, a conductive material slurry 1 (carbon nanotube dispersion) in Example 1 was prepared as a fibrous carbon nanostructure dispersion. The dispersion treatment was performed by circulating the dispersion in such a way that the dispersion was discharged from and injected back into the high-pressure homogenizer. This circulation was repeated 20 times. The dispersion was discharged and injected at 30 g/min.

The viscosity of the conductive material slurry 1 was measured at 25° C. and was found to be 830 mPa·s.

Example 2 to 10, Comparative Example 1 to 7

Conductive material slurries 2 to 17 (carbon nanotube dispersions) in Examples 2 to 10 and Comparative Examples 1 to 7 were prepared in the same manner as Example 1, except that the types and contents of the dispersant composition, the conductive materials, and the additional solvent were as shown in Tables 3 to 5.

Table 5 shows the content (mass %) of each component in each of the conductive material slurries thus prepared and the viscosity of each of the conductive material slurries.

TABLE 5

| Type of conductive material slurry | | Dispersant composition | | | | |
|---|---|---|---|---|---|---|
| | | Type | Content (mass %) | Content of dispersant* with respect to 100 parts by mass of conductive material (D) (parts by mass) | Content of amine compound* with respect to 100 parts by mass of dispersant* (parts by mass) | Content of amine compound* with respect to 100 parts by mass of conductive material (D) (parts by mass) |
| Ex. 1 | Slurry 1 | Composition 1 | 5 | 20 | 100 | 20 |
| Ex. 2 | Slurry 2 | Composition 2 | 5 | 20 | 100 | 20 |
| Ex. 3 | Slurry 3 | Composition 3 | 5 | 20 | 100 | 20 |
| Ex. 4 | Slurry 4 | Composition 4 | 5 | 20 | 100 | 20 |
| Ex. 5 | Slurry 5 | Composition 5 | 5 | 20 | 100 | 20 |
| Ex. 6 | Slurry 6 | Composition 6 | 5 | 20 | 100 | 20 |
| Ex. 7 | Slurry 7 | Composition 7 | 5 | 20 | 100 | 20 |
| Ex. 8 | Slurry 8 | Composition 8 | 5 | 20 | 100 | 20 |
| Ex. 9 | Slurry 9 | Composition 9 | 5 | 20 | 100 | 20 |
| Ex. 10 | Slurry 10 | Composition 10 | 5 | 20 | 100 | 20 |
| Comp. Ex. 1 | Slurry 11 | Composition 11 | 5 | 20 | 0 | 0 |
| Comp. Ex. 2 | Slurry 12 | Composition 12 | 5 | 20 | 100 | 20 |
| Comp. Ex. 3 | Slurry 13 | Composition 13 | 5 | 20 | 100 | 20 |
| Comp. Ex. 4 | Slurry 14 | Composition 14 | 5 | 20 | 100 | 20 |
| Comp. Ex. 5 | Slurry 15 | Composition 15 | 5 | 20 | 100 | 20 |
| Comp. Ex. 6 | Slurry 16 | Composition 16 | 5 | 20 | 0 | 0 |
| Comp. Ex. 7 | Slurry 17 | Composition 17 | 5 | 20 | 100 | 20 |

| Type of conductive material slurry | | Conductive material (D) | | Additional solvent | | |
|---|---|---|---|---|---|---|
| | | Type | Content (mass %) | Type | Content (mass %) | Viscosity (mPa · s) |
| Ex. 1 | Slurry 1 | N | 5 | NMP | 90 | 830 |
| Ex. 2 | Slurry 2 | N | 5 | NMP | 90 | 980 |
| Ex. 3 | Slurry 3 | N | 5 | NMP | 90 | 1050 |
| Ex. 4 | Slurry 4 | N | 5 | NMP | 90 | 1250 |
| Ex. 5 | Slurry 5 | N | 5 | NMP | 90 | 930 |
| Ex. 6 | Slurry 6 | N | 5 | NMP | 90 | 1350 |
| Ex. 7 | Slurry 7 | N | 5 | NMP | 90 | 1270 |
| Ex. 8 | Slurry 8 | N | 5 | NMP | 90 | 590 |
| Ex. 9 | Slurry 9 | N | 5 | NMP | 90 | 1290 |
| Ex. 10 | Slurry 10 | N | 5 | NMP | 90 | 1150 |

TABLE 5-continued

| | | | | | | |
|---|---|---|---|---|---|---|
| Comp. Ex. 1 | Slurry 11 | N | 5 | NMP | 90 | 3500 |
| Comp. Ex. 2 | Slurry 12 | N | 5 | NMP | 90 | 1330 |
| Comp. Ex. 3 | Slurry 13 | N | 5 | NMP | 90 | 1540 |
| Comp. Ex. 4 | Slurry 14 | N | 5 | NMP | 90 | 1480 |
| Comp. Ex. 5 | Slurry 15 | N | 5 | NMP | 90 | 1430 |
| Comp. Ex. 6 | Slurry 16 | N | 5 | NMP | 90 | 4680 |
| Comp. Ex. 7 | Slurry 17 | N | 5 | NMP | 90 | 1920 |

*The dispersant refers to the acrylic polymer (A) and the comparison substance thereof.
*The amine compound refers to the compound (B) and the comparison substance thereof.

As shown in Table 5, the conductive material slurries in Examples 1 to 5 and the conductive material slurries in Comparative Examples 1 to 5 are the same in the dispersant, but each of the conductive material slurries in Examples 1 to 5 contains the compound (B) and has a lower viscosity and better dispersibility of the carbon nanotubes than those of the conductive material slurry in Comparative Example 1, which does not contain the compound (B).

The comparison between Example 1 and Comparative Example 7 shows that the combination of the acrylic polymer (A) with the compound (B) significantly reduces the viscosity.

4. Preparation of Positive Electrode Paste (Example 11 to 17, Comparative Example 8 to 14)

Example 11

First, 2.04 g of the conductive material slurry 1 (Example 1), 0.50 g of NMP (additional solvent), and 3.8 g of an NMP solution of PVDF (solid content: 8%, KF polymer L #7208 manufactured by KUREHA CORPORATION, binder resin solution) were weighed in a 50 ml sample bottle and stirred uniformly with a spatula. Then, this mixture was blended with 15 g of LCO (lithium cobalt oxide, "GSL-5D" manufactured by Beijing Easpring Material Technology Co., Ltd.) as a positive electrode active material, and stirred again with a spatula until they became homogeneous. The resulting mixture was further stirred with a rotation-revolution mixer (AR-100 manufactured by THINKY CORPORATION) for 10 minutes. Thus, a positive electrode paste (Example 11) was prepared. The positive electrode paste contained 70.29% by mass of the positive electrode active material, 0.478% by mass of the conductive materials, 0.096% by mass of the amine compound, 0.096% by mass of the dispersant, and 1.42% by mass of the binder resin.

The mass ratio of the positive electrode active material, the binder (PVDF), the conductive materials (carbon nanotubes), and the dispersant (acrylic polymer (A) was 97.24:1.97:0.66:0.13 (in terms of solid content). The solid content (% by mass) of the positive electrode paste was 72.29% by mass. In this case, the total solid content of the positive electrode paste refers to the total mass of the dispersant (acrylic polymer (A), the positive electrode active material, the conductive materials, and the binder that are contained in the positive electrode paste. The viscosity of the positive electrode paste was measured at 25° C. and was found to be 6.2 Pa·s.

Example 12 to 17, Comparative Example 8 to 14

Positive electrode pastes (Examples 12 to 17 and Comparative Examples 8 to 14) were prepared in the same manner as Example 11, except that the type of the conductive material slurry was changed to those shown in Table 6. Table 6 shows the content (mass %) of each component in each of the positive electrode pastes thus prepared, and Table 7 shows the viscosity of each of the positive electrode pastes at 25° C.

TABLE 6

| Positive electrode paste | Content of positive electrode active material (LCO) (mass %) In paste | In coating | Content of conductive material slurry and component thereof (mass %) Conductive material slurry | | In paste Conductive material | Amine compound* | Dispersant* | In coating Dispersant* | Conductive material | Amine compound* | Binder resin solution (PVDF 8% solution) (mass %) In paste | In coating PVDF | Additional solvent (NMP) (mass %) In paste |
|---|---|---|---|---|---|---|---|---|---|---|---|---|---|
| Ex. 11 | 70.29% | 97.24% | Slurry 1 | 9.56% | 0.478% | 0.096% | 0.096% | 0.132% | 0.661% | 0.0067% | 17.81% | 1.97% | 2.34% |
| Ex. 12 | 70.29% | 97.24% | Slurry 2 | 9.56% | 0.478% | 0.096% | 0.096% | 0.132% | 0.661% | 0.0067% | 17.81% | 1.97% | 2.34% |
| Ex. 13 | 70.29% | 97.24% | Slurry 3 | 9.56% | 0.478% | 0.096% | 0.096% | 0.132% | 0.661% | 0.0067% | 17.81% | 1.97% | 2.34% |
| Ex. 14 | 70.29% | 97.24% | Slurry 4 | 9.56% | 0.478% | 0.096% | 0.096% | 0.132% | 0.661% | 0.0067% | 17.81% | 1.97% | 2.34% |
| Ex. 15 | 70.29% | 97.24% | Slurry 5 | 9.56% | 0.478% | 0.096% | 0.096% | 0.132% | 0.661% | 0.0067% | 17.81% | 1.97% | 2.34% |
| Ex. 16 | 70.29% | 97.24% | Slurry 6 | 9.56% | 0.478% | 0.096% | 0.096% | 0.132% | 0.661% | 0.0067% | 17.81% | 1.97% | 2.34% |
| Ex. 17 | 70.29% | 97.24% | Slurry 7 | 9.56% | 0.478% | 0.096% | 0.096% | 0.132% | 0.661% | 0.0067% | 17.81% | 1.97% | 2.34% |
| Comp. Ex. 8 | 70.29% | 97.24% | Slurry 11 | 9.56% | 0.478% | 0.000% | 0.096% | 0.132% | 0.661% | 0.000% | 17.81% | 1.97% | 2.34% |
| Comp. Ex. 9 | 70.29% | 97.24% | Slurry 12 | 9.56% | 0.478% | 0.096% | 0.096% | 0.132% | 0.661% | 0.0067% | 17.81% | 1.97% | 2.34% |
| Comp. Ex. 10 | 70.29% | 97.24% | Slurry 13 | 9.56% | 0.478% | 0.096% | 0.096% | 0.132% | 0.661% | 0.0067% | 17.81% | 1.97% | 2.34% |
| Comp. Ex. 11 | 70.29% | 97.24% | Slurry 14 | 9.56% | 0.478% | 0.096% | 0.096% | 0.132% | 0.661% | 0.0067% | 17.81% | 1.97% | 2.34% |
| Comp. Ex. 12 | 70.29% | 97.24% | Slurry 15 | 9.56% | 0.478% | 0.096% | 0.096% | 0.132% | 0.661% | 0.0067% | 17.81% | 1.97% | 2.34% |

TABLE 6-continued

| Positive electrode paste | Content of positive electrode active material (LCO) (mass %) In paste | In coating | Content of conductive material slurry and component thereof (mass %) In paste: Conductive material slurry | Conductive material | Amine compound* | Dispersant* | In coating: Dispersant* | Conductive material | Amine compound* | Binder resin solution (PVDF 8% solution) (mass %) In paste | In coating PVDF | Additional solvent (NMP) (mass %) In paste |
|---|---|---|---|---|---|---|---|---|---|---|---|---|
| Comp. Ex. 13 | 70.29% | 97.24% | Slurry 16 9.56% | 0.478% | 0.000% | 0.096% | 0.132% | 0.661% | 0.000% | 17.81% | 1.97% | 2.34% |
| Comp. Ex. 14 | 70.29% | 97.24% | Slurry 17 9.56% | 0.478% | 0.096% | 0.096% | 0.132% | 0.661% | 0.0067% | 17.81% | 1.97% | 2.34% |

*The dispersant refers to the acrylic polymer (A) and the comparison substance thereof.
*The amine compound refers to the compound (B) and the comparison substance thereof.

TABLE 7

| Positive electrode paste | Dispersant composition used in preparation of positive electrode paste | Evaluation: Viscosity (Pa · s) | Coating resistance (Ω · cm) | Direct-current resistance (Ω) |
|---|---|---|---|---|
| Ex. 11 | Composition 1 | 6.2 | 60.0 | 8.2 |
| Ex. 12 | Composition 2 | 6.4 | 54.0 | 8.3 |
| Ex. 13 | Composition 3 | 6.8 | 67.5 | 8.5 |
| Ex. 14 | Composition 4 | 7.2 | 60.0 | 8.1 |
| Ex. 15 | Composition 5 | 6.0 | 46.5 | 7.9 |
| Ex. 16 | Composition 6 | 6.2 | 57.0 | 8.3 |
| Ex. 17 | Composition 7 | 6.5 | 52.6 | 8.7 |
| Comp. Ex. 8 | Composition 11 | 11.5 | 144 | 13.6 |
| Comp. Ex. 9 | Composition 12 | 10.7 | 143 | 12.3 |
| Comp. Ex. 10 | Composition 13 | 11.6 | 137 | 13.5 |
| Comp. Ex. 11 | Composition 14 | 12.4 | 152 | 14.5 |
| Comp. Ex. 12 | Composition 15 | 11.2 | 147 | 12.8 |
| Comp. Ex. 13 | Composition 16 | 13.5 | 177 | 17.5 |
| Comp. Ex. 14 | Composition 17 | 10.2 | 172 | 16.2 |

The positive electrode pastes in Examples 11 to 17 were prepared respectively by using the dispersant compositions 1 to 7, each containing the acrylic polymer (A) and the compound (B). As shown in Table 7, the viscosities of the positive electrode pastes in Examples 11 to 17 are lower than those of the positive electrode pastes in Comparative Examples 8 to 14. Table 7 also shows that the positive electrode coatings, which were produced by using the positive electrode pastes in Examples 11 to 17, have significantly smaller volume resistance values than those of the positive electrode coatings, which were produced by using the positive electrode pastes in Comparative Examples 8 to 14. Moreover, the power storage devices, which were produced by using the positive electrode pastes in Examples 11 to 17, have significantly smaller direct-current resistance values than those of the power storage devices, which were produced by using the positive electrode pastes in Comparative Examples 8 to 14.

INDUSTRIAL APPLICABILITY

The dispersant composition of the present disclosure can reduce the viscosities of the carbon material-based conductive material slurry and the positive electrode paste. The use of the dispersant composition of the present disclosure in the preparation of the positive electrode paste of the present disclosure can reduce the resistance value of the positive electrode coating and the direct-current resistance value of the power storage device.

The invention claimed is:

1. A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1), and the compound (B) is dihexylamine:

[Chemical Formula 1]

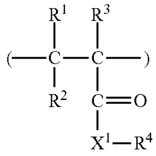

(1)

in the formula (1), $R^1$, $R^2$, and $R^3$ are the same as or different from each other and represent a hydrogen atom, a methyl group, or an ethyl group, $X^1$ represents a nitrogen atom or an oxygen atom, and $R^4$ represents a hydrocarbon group having 8 to 30 carbon atoms.

2. The dispersant composition according to claim 1, wherein a content of the constitutional unit a represented by the formula (1) in the acrylic polymer (A) is 10% by mass or more and 80% by mass or less.

3. The dispersant composition according to claim 1, wherein the acrylic polymer (A) further contains at least one constitutional unit b selected from the group consisting of a constitutional unit b1 represented by the following formula (2) and a constitutional unit b2 represented by the following formula (3):

[Chemical Formula 2]

(2)

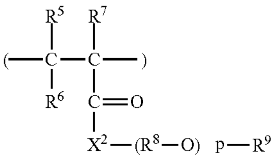

in the formula (2), $R^5$, $R^6$, and $R^7$ are the same as or different from each other and represent a hydrogen atom, a methyl group, or an ethyl group, $X^2$ represents a nitrogen atom or an oxygen atom, $R^8$ represents an alkylene group having 2 to 4 carbon atoms, p represents 1 or more and 8 or less, and $R^9$ represents a hydrogen atom or a methyl group,

[Chemical Formula 3]

(3)

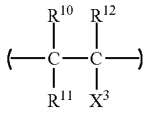

in the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms.

4. The dispersant composition according to claim 1, wherein the acrylic polymer (A) further contains a constitutional unit c represented by the following formula (4):

[Chemical Formula 4]

(4)

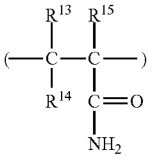

in the formula (4), $R^{13}$, $R^{14}$, and $R^{15}$ are the same as or different from each other and represent a hydrogen atom, a methyl group, or an ethyl group.

5. The dispersant composition according to claim 1, wherein a weight average molecular weight of the acrylic polymer (A) is 5000 or more and 1000000 or less.

6. The dispersant composition according to claim 1, wherein a content of the compound (B) is 10 parts by mass or more and 300 parts by mass or less with respect to 100 parts by mass of the acrylic polymer (A).

7. The dispersant composition according to claim 1, wherein a mass ratio (acrylic polymer (A)/compound (B)) of the acrylic polymer (A) to the compound (B) is 0.1 or more and 1.5 or less.

8. A carbon material-based conductive material slurry comprising:

the dispersant composition according to claim 1; and carbon material-based conductive materials (D).

9. The carbon material-based conductive material slurry according to claim 8, wherein the carbon material-based conductive materials (D) include at least one selected from the group consisting of carbon black, carbon nanotubes, and graphene.

10. A positive electrode paste for a power storage device, comprising:

the dispersant composition according to claim 1.

11. A method for producing a positive electrode coating, comprising:

applying the positive electrode paste according to claim 10 to a current collector; and then drying the positive electrode paste.

12. The method for producing a positive electrode coating according to claim 11, wherein the positive electrode paste comprises a carbon-based conductive material, wherein the carbon-based conductive material is carbon nanotubes.

13. The method for producing a positive electrode coating according to claim 11, wherein the method further comprises preparing the positive electrode paste, and wherein preparing the positive electrode paste comprises mixing a carbon material-based conductive material slurry, a binder, a solvent, and a positive electrode active material and, in preparing the carbon material-based conductive material slurry, a mixture containing the dispersant composition and the carbon material-based conductive material is dispersed using a high-pressure homogenizer.

14. A method for producing a positive electrode for a power storage device, the positive electrode comprising a current collector and a positive electrode coating disposed on the current collector, the method comprising:

applying the positive electrode paste according to claim 10 to a current collector; and then drying the positive electrode paste.

15. The method for producing a positive electrode according to claim 14, wherein the positive electrode paste comprises a carbon-based conductive material, wherein the carbon-based conductive material is carbon nanotubes.

16. The method for producing a positive electrode according to claim 14, wherein the method further comprises preparing the positive electrode paste, and wherein preparing the positive electrode paste comprises mixing a carbon material-based conductive material slurry, a binder, a solvent, and a positive electrode active material and, in preparing the carbon material-based conductive material slurry, a mixture containing the dispersant composition and the carbon material-based conductive material is dispersed using a high-pressure homogenizer.

17. A dispersant composition for an electrode of a power storage device, comprising:

an acrylic polymer (A);

an amine compound (B) with a boiling point of 200° C. or less; and an organic solvent (C), wherein the acrylic polymer (A) contains a constitutional unit a represented by the following formula (1), at least one constitutional unit b selected from the group consisting of a constitutional unit b1 represented by the following formula (2) and a constitutional unit b2 represented by the following formula (3), and a constitutional unit c represented by the following formula (4), and the compound (B) is dihexylamine:

[Chemical Formula 1]

(1)

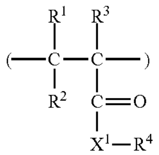

in the formula (1), $R^1$, $R^2$, and $R^3$ are the same as or different from each other and represent a hydrogen atom, a methyl group, or an ethyl group, $X^1$ represents a nitrogen atom or an oxygen atom, and $R^4$ represents a hydrocarbon group having 8 to 30 carbon atoms,

[Chemical Formula 2]

(2)

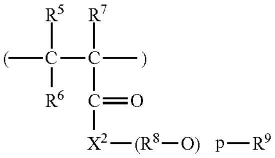

in the formula (2), $R^5$, $R^6$, and $R^7$ are the same as or different from each other and represent a hydrogen atom, a methyl group, or an ethyl group, $X^2$ represents a nitrogen atom or an oxygen atom, $R^8$ represents an alkylene group having 2 to 4 carbon atoms, p represents 1 or more and 8 or less, and $R^9$ represents a hydrogen atom or a methyl group,

[Chemical Formula 3]

(3)

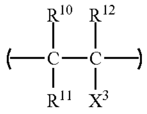

in the formula (3), $R^{10}$, $R^{11}$, and $R^{12}$ are the same as or different from each other and represent a hydrogen atom, a methyl group, or an ethyl group, and $X^3$ represents a cyano group or a pyridinyl group that may have a hydrocarbon group having 1 to 4 carbon atoms,

[Chemical Formula 4]

(4)

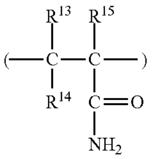

in the formula (4), $R^{13}$, $R^{14}$, and $R^{15}$ are the same as or different from each other and represent a hydrogen atom, a methyl group, or an ethyl group.

* * * * *